United States Patent [19]
Toyohara et al.

[11] Patent Number: 5,885,156
[45] Date of Patent: Mar. 23, 1999

[54] VIDEO GAME APPARATUS, METHOD OF CONTROLLING THE GROWTH OF PLAY CHARACTER IN VIDEO GAME, AND VIDEO GAME MEDIUM THEREFOR

[75] Inventors: Koji Toyohara; Naoki Nishikawa, both of Kobe; Makiko Yamada, Otsu, all of Japan

[73] Assignee: Konami Co., Ltd., Hyogo-ken, Japan

[21] Appl. No.: 774,323

[22] Filed: Nov. 21, 1996

[30] Foreign Application Priority Data

Nov. 24, 1995 [JP] Japan .................................... 7-305285

[51] Int. Cl.⁶ ..................................................... A63F 9/22
[52] U.S. Cl. ..................................... 463/1; 463/44; 463/4
[58] Field of Search ................................ 434/307 R, 309, 434/169, 323, 308, 185, 159, 307 A, 167, 156; 463/1, 4, 8, 9, 44, 35; 395/173; 345/122, 327

[56] References Cited

U.S. PATENT DOCUMENTS

| | | |
|---|---|---|
| 4,491,324 | 1/1985 | Yoshida . |
| 4,858,930 | 8/1989 | Sato . |
| 5,390,937 | 2/1995 | Sakaguchi et al. . |
| 5,411,259 | 5/1995 | Pearson et al. . |
| 5,498,002 | 3/1996 | Gechter . |
| 5,547,201 | 8/1996 | Honeywill . |
| 5,618,043 | 4/1997 | McGlew . |

FOREIGN PATENT DOCUMENTS

| | | |
|---|---|---|
| 346 492 | 12/1989 | European Pat. Off. . |
| 372 840 | 6/1990 | European Pat. Off. . |
| 575 943 | 12/1993 | European Pat. Off. . |
| 0634727 | 1/1995 | European Pat. Off. . |
| 07155463 | 6/1995 | European Pat. Off. . |
| 0800830 | 1/1996 | European Pat. Off. . |
| 93/0452 | 2/1993 | WIPO . |

OTHER PUBLICATIONS

Yilin Zhao and Terry E. Weymouth, "An Adaptive Route-Guidance Algorithm for Intelligent Vehicle Highway Systems", Proceeding of the American Control Conference, Bost, Jun. 26–28, 1991, vol. 3,26, pp. 2568–2573.
Wizard's Crown ©1986 by Strategic Simulations, Inc.

Primary Examiner—Michael O'Neill
Attorney, Agent, or Firm—Jordan and Hamburg LLP

[57] ABSTRACT

A game cartridge is inserted into a game device, and a controller is operated to display and perform a game stored in the game cartridge on a display monitor. The game cartridge has a ROM for storing a game program and a RAM for storing data of a play character having unique abilities. The controller is operated to instruct a play character to repeat various patterns of speech and action to increase the number of "remaining experience credits". Obtained "remaining experience credits" are assigned to abilities of the play characters to achieve desired ability values for thereby growing the play character until it develops unique abilities.

9 Claims, 25 Drawing Sheets

FIG.5

PLAYER CREATION

NAME | ITOH

| TEAM | OLEX |
|---|---|
| CALLING HIMSELF | WATASHI |
| RIGHT- OR LEFT-HANDED | RIGHT-HANDED THROWER LEFT-HANDED BATTER |

RIGHT- OR LEFT-HANDED

| FIELD POSITION | | |
|---|---|---|
| FORM | | |
| HOBBY | | |

FINISHED

- RIGHT-HANDED THROWER, RIGHT-HANDED BATTER
- RIGHT-HANDED THROWER, LEFT-HANDED BATTER
- RIGHT-HANDED THROWER, SWITCH-HITTER
- LEFT-HANDED THROWER, RIGHT-HANDED BATTER
- LEFT-HANDED THROWER, LEFT-HANDED BATTER
- LEFT-HANDED THROWER, SWITCH-HITTER

FIG.13

HITTING AT PITCHER

SWINGING WIDE

5TH TIME AT BAT

THREE STRIKES

HIT

FIG. 15

| REMAINING EXPERIENCE CREDITS | | ABILITY INCREASE | | |
|---|---|---|---|---|
| | MUSCLE POWER | AGILITY | TECHNIQUE | |
| | 36 | 65 | 44 | |

| RETURN | | | PRESENT ABILITY | | ABILITY AFTER CHANGED | |
|---|---|---|---|---|---|---|
| | | 20 | | | | |
| MEET CIRCLE | 10 | | | D | → | D |
| BATTING POWER | 4 | 40 | 10 | 65 | → | 65 |
| RUNNING POWER | | 5 | 5 | 8 D | → | 8 D |
| SHOULDER POWER | 24 | 10 | 32 | 8 D | → | 8 D |
| FIELDING | | 15 | 15 | 8 D | → | 8 D |
| CHANCE | 15 | | | | | |

MEET CURSOR SIZE UPON HITTING

FIG.16

| REMAINING EXPERIENCE CREDITS | MUSCLE POWER | AGILITY | TECHNIQUE |
|---|---|---|---|
| | 0 | 2 | 2 |

ABILITY INCREASE

|  | | | |
|---|---|---|---|
| FOR LEFT-HANDED PITCHER | 15 | 15 | 15 |
| BUNTING | | | 30 |
| INFIELD HIT | 80 | 80 | 40 |
| POWER HITTER | 30 | 20 | 30 |
| AVERAGE HITTER | | 20 | 30 |
| HEAD SLIDING | | 20 | 20 |
| STOLEN BASE | | | |

PRESENT ABILITY

ABILITY AFTER CHANGED

SLIDE ONTO 1ST BASE AT CRITICAL MOMENT

FIG.17

| REMAINING EXPERIENCE CREDITS | | ABILITY INCREASE | | |
|---|---|---|---|---|
| | MUSCLE POWER | AGILITY | TECHNIQUE | |
| 4 | 30 | 50 | 7 | |

| | | | PRESENT ABILITY | ABILITY AFTER CHANGED |
|---|---|---|---|---|
| RETURN | | | | |
| MEET CIRCLE | 10 | | D | D |
| BATTING POWER | 4 | 40 | 65 | → 67 |
| RUNNING POWER | | 5 | 8 D | → 8 D |
| SHOULDER POWER | 24 | 10 | 8 D | → 9 D |
| FIELDING | | 32 | 8 D | → 9 D |
| CHANCE | ACHIEVED | | | |

POWER TO THROW BALL FAR AWAY

VIDEO GAME APPARATUS, METHOD OF CONTROLLING THE GROWTH OF PLAY CHARACTER IN VIDEO GAME, AND VIDEO GAME MEDIUM THEREFOR

BACKGROUND OF THE INVENTION

The present invention relates to a video game apparatus, which can be played by a video game player, for controlling a play character displayed on a video screen to perform role playing for the video game player to develop a certain ability, which may be a personality, a method of controlling the growth of such a play character, and a medium which stores a game program of such a role playing game.

There are known various role playing games which can be played by a video game player to control a play character displayed on a video screen to perform role playing for the video game player. One of the known role playing games is a battle game in which a displayed play character grows while repeating battles against an opponent character in various scenes. According to another role playing game, a plurality of abilities available from a list of ability settings are selectively assigned to a play character to give the play character a certain personality.

In the above battle game, as the play character experiences more and more fights against the opponent character, the play character develops an increased combat ability. However, the combat ability of the play character increases or decreases with the game playing ability of the video game player, and the factor which governs the growth of the combat ability depends solely on how the play character fights with the opponent character. Consequently, the game ends up with similar results at all times, and fails to interest the game player sufficiently. In the other role playing game, the personality of the play character is established just as instructed by the game player. Therefore, the game player may soon lose interest in this role playing game for lack of variations in selecting play character personalities.

SUMMARY OF THE INVENTION

It is therefore an object of the present invention to provide a video game apparatus which can be played by a video game player to repeatedly select various patterns of speech and action of a play character to increase or reduce, with probability, the number of credits given to the play character, and to assign some of the earned credits to various abilities to enable the play character to exhibit a unique personality.

Another object of the present invention is to provide a method of controlling the growth of a play character in a video game that can be played on such a video game apparatus.

Still another object of the present invention is to provide a video game medium which stores a game program of such a video game.

According to an aspect of the present invention, there is provided a video game apparatus comprising a display unit for displaying a play character and patterns of speech/action made by the play character, and menus corresponding to the patterns of speech and action, a control unit for selectively indicating the menus, speech/action memory means for storing a pattern of speech/action indicated by the control unit, speech/action control means for reading the pattern of speech/action indicated by the control unit from the speech/ action memory means and controlling the play character to perform the pattern of speech/action, credit memory means for storing at least one type of credits given to the play character, credit varying means for increasing or reducing the number of credits of the at least one type depending on the pattern of speech/action indicated by the control unit, probability control means for increasing or reducing the number of credits with a probability depending on the pattern of speech/action indicated by the control unit, ability value memory means for storing a plurality of ability values representing a plurality of abilities of the play character, and ability value distributing means for distributing the credits stored in the credit memory means to the plurality of ability values with the control unit, and updating the ability values stored in the ability value memory means according to the distributed credits.

With the above arrangement, a plurality of menus are displayed on a display screen, and the control unit is operated to select one of the menus. A pattern of speech/ action corresponding to the selected menu is performed, and the number of credits is increased or reduced in accordance with a given probability based on the performance of the pattern of speech/action. Specifically, if the selected pattern of speech/action is preferable, then the number of credits is increased, and if the selected pattern of speech/action is not preferable, then the number of credits is reduced. The video game player makes attempts to obtain as many credits as possible and assign the credits to abilities of the play character for thereby increasing ability values for abilities desired by the video game player. The video game player thus finds the video game interesting and can play the video game with a lot of fun.

The control unit may have at least one type of speech/ action governed by an ability of a video game player, and the probability control means may comprise means for varying the probability based on the type of speech/action. Therefore, the video game player may be directly involved in the growth of the play character depending on certain types of speech/action.

The probability control means may comprise means for varying the probability depending on a plurality of patterns of speech/action indicated by the control unit. Therefore, a history of selected patterns of speech/action may greatly affect the acquisition of credits, causing the video game to develop with much interest and fun.

The video game apparatus may further comprise timer means for allowing a predetermined period of time to elapse each time the control unit selects one of the menus, the speech/action control means comprising means for randomly varying the pattern of speech/action depending on the passage of the predetermined period of time when the control unit selects one of the menus, the probability control means comprising means for varying the probability depending on the pattern of speech/action randomly varied by the speech/action control means. Since time is reflected as a new element in the development of the video game, the process of growth of the play character simulates an actual growing process more accurately, and the level of difficulty of the video game is made higher, for thereby making the video game more interesting to the video game player.

The video game apparatus may further comprise physical/ mental condition memory means for storing a physical/ mental condition of the play character, and physical/mental condition changing means for changing the physical/mental condition of the play character depending on the pattern of speech/action indicated by the control unit, the probability control means comprising means for varying the probability depending on the physical/mental condition of the play character. Inasmuch as a physical/mental condition such as a physical shape or guts is reflected as a new element in the development of the video game, the process of growth of the play character simulates an actual growing process more accurately, and the level of difficulty of the video game is made higher, for thereby making the video game more interesting to the video game player.

The video game apparatus may further comprise competing game control means for carrying out a competing game with the display unit, the control unit having means for selecting either one of a mode for growing the play character and a mode for performing the competing game, the competing game control means comprising means responsive to a selection by the control unit of the mode for performing the competing game, for introducing the play character having the ability values into the competing game and controlling the play character to act according to the ability values in the competing game. The play character which simulates the video game player is grown to achieve abilities close to those of the video game player, and thereafter participates in a competing game. In the competing game, the play character acts according to the ability values given thereto.

According to another aspect of the present invention, there is also provided a method of controlling the growth of a play character in a video game performed by a video game apparatus having a display unit for displaying a play character and patterns of speech/action made by the play character, and menus corresponding to the patterns of speech and action, a control unit for selectively indicating the menus, speech/action memory means for storing a pattern of speech/action indicated by the control unit, and speech/action control means for reading the pattern of speech/action indicated by the control unit from the speech/action memory means and controlling the play character to perform the pattern of speech/action, the method comprising the steps of imparting or reducing the number of credits of the at least one type with a probability depending on the pattern of speech/action indicated by the control unit, storing the increased or reduced number of credits of the at least one type, operating the control unit to distribute the stored number of credits of the at least one type to a plurality of ability values representing a plurality of abilities of the play character, and storing the ability values with the distributed number of credits of the at least one type. In the above method, a plurality of menus are displayed on a display screen, and the control unit is operated to select one of the menus. A pattern of speech/action corresponding to the selected menu is performed, and the number of credits is increased or reduced with a given probability based on the performance of the pattern of speech/action. Specifically, if the selected pattern of speech/action is preferable, then the number of credits is increased, and if the selected pattern of speech/action is not preferable, then the number of credits is reduced. The video game player makes attempts to obtain as many credits as possible and assign the credits to abilities of the play character for thereby increasing ability values for abilities desired by the video game player. The video game player thus finds the video game interesting and can play the video game with a lot of fun.

According to still another aspect of the present invention, there is also provided a video game medium for use in a video game for displaying patterns of speech/action made by a play character, selectively indicating menus corresponding to the patterns of speech and action with a control unit, and controlling the play character to perform a pattern of speech/action indicated by the control unit, the video game medium comprising means for imparting at least one type of credits to the play character, means for increasing or reducing the number of credits of the at least one type with a probability depending on the pattern of speech/action indicated by the control unit, means for storing the increased or reduced number of credits of the at least one type, means for operating the control unit to distribute the stored number of credits of the at least one type to a plurality of ability values representing a plurality of abilities of the play character, and means for storing the ability values with the distributed number of credits of the at least one type.

The video game medium may comprise a cartridge having a recording medium in the form of a ROM or a RAM backed up by a cell, a CD-ROM in the form of a magnetooptical disk, a floppy disk, or the like. A game program is stored in the video game medium. When the game program is executed, a pattern of speech/action of the play character is performed, and credits given to the play character can simply be assigned to ability values of the play character by operating the control unit only. Though the video game has various aspects variable with a probability and has a high level of difficulty, it can be performed with ease and gives much interest and fun to the video game player.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 5 is a view of a screen image displayed on the display screen for entering personal data to identify a rookie baseball player;

FIG. 13 is a view of a screen image displayed on the display screen, showing the results of the baseball player played as a starting member of the farm team;

FIG. 15 is a view of a screen image displayed on the display screen when "ability increase" is selected;

FIG. 16 is a view of a scrolled screen image displayed on the display screen when "ability increase" is selected;

FIG. 17 is a view similar to FIG. 15, showing a screen image after abilities are increased;

DETAILED DESCRIPTION OF THE INVENTION

Figure 1:
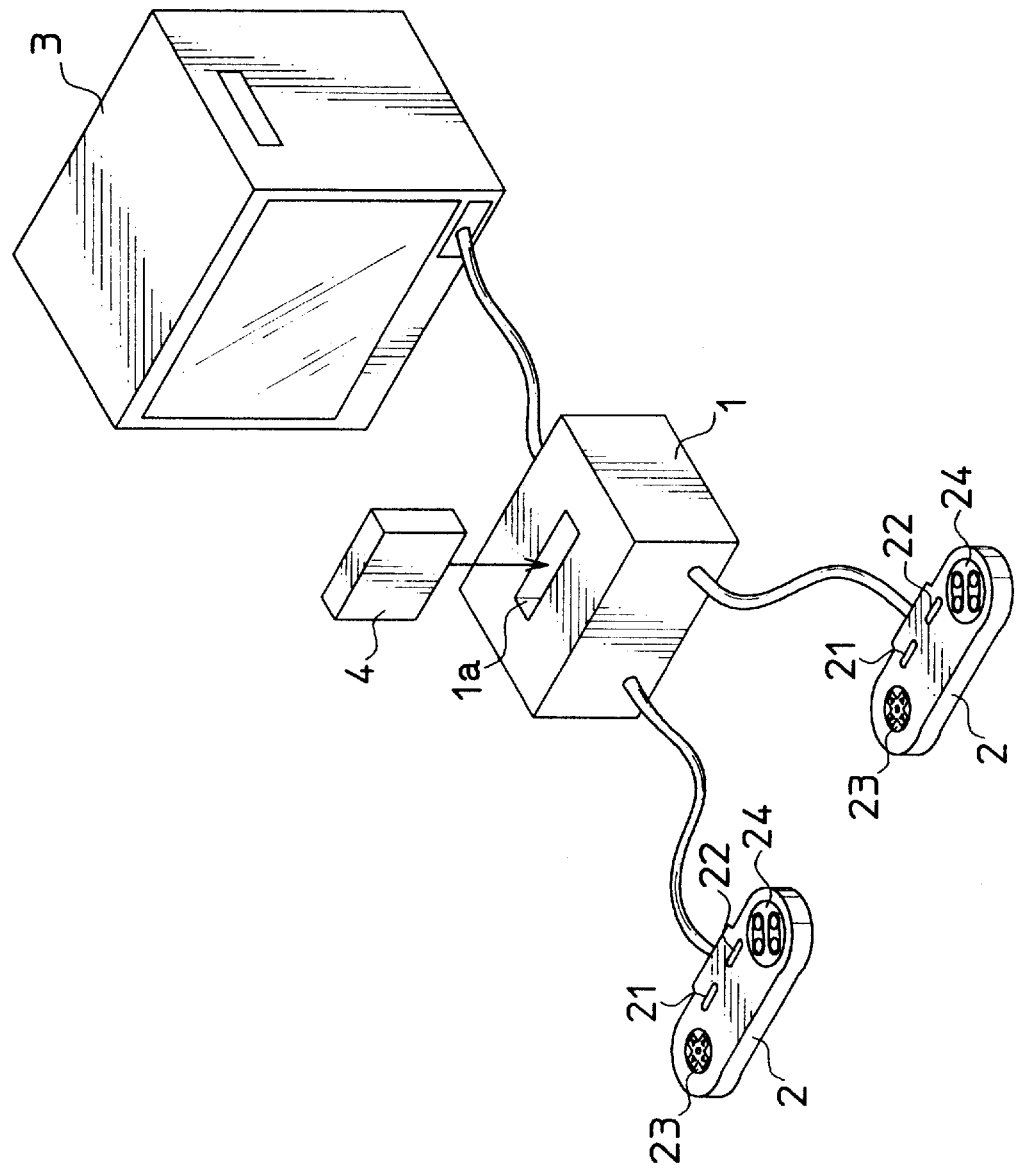
FIG. 1 is a perspective view of a video game apparatus according to the present invention.

As shown in FIG. 1, a video game apparatus according to the present invention basically comprises a game device 1, a pair of controllers 2 connected to the game device 1 for sending commands to the game device 1, and a display monitor 3 such as a television receiver or the like connected to the game device 1 for displaying video game images. A game cartridge 4 having a read-only memory (ROM) 41 (see FIG. 2) which stores game programs can removably be inserted into a cartridge slot 1a in the game device 1. When the game cartridge 4 is inserted in the cartridge slot 1a, the ROM 41 and other circuits in the game cartridge 4 are electrically connected to an electric circuit (see FIG. 2) in the game device 1. The game cartridge 4 also has a random-access memory (RAM) 42 (see FIG. 2) for storing data and a backup cell B (see FIG. 2) for keeping desired data in the RAM 42.

Each of the controllers 2 has a start key 21, a reset key 22, a cross key 23 for indicating vertical and horizontal movements for a play character and other related characters displayed on the display monitor 3 and moving a cursor to various menus displayed on the display monitor 3, and a control key 24 for indicating actions for the play character and also indicating a selected menu. One or both of the controllers 2 are connected to the game device 1 so that one or two players can play a video game whose game program is stored in the game cartridge 4.

The game device 1 houses therein a microcomputer, a ROM 101 and a RAM 102 (see FIG. 2) for processing the video game according to commands transmitted from the controllers 2 based on the game program stored in the ROM 41 and data stored in the RAM 42.

Figure 2:
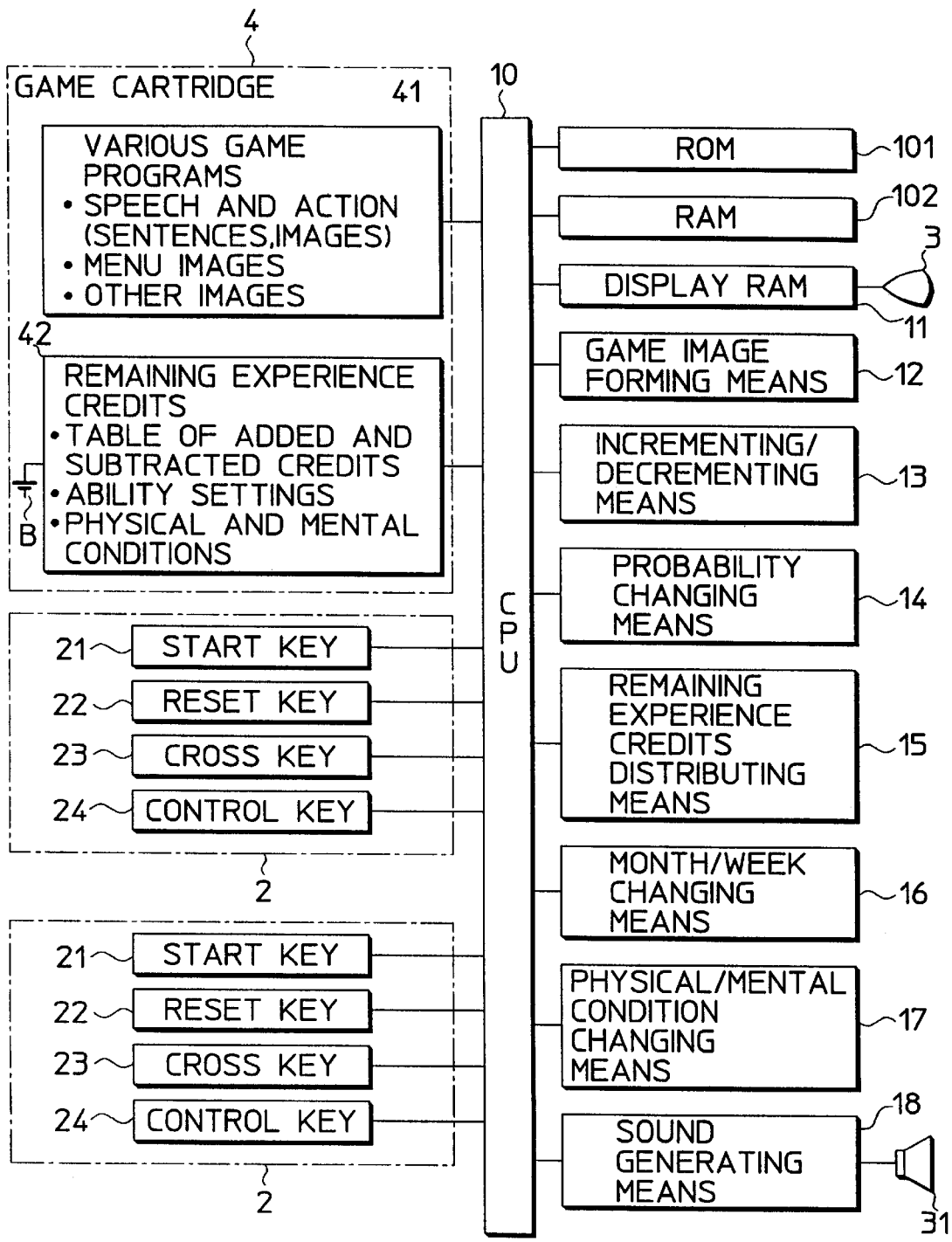
FIG. 2 is a block diagram of an electric system of the video game apparatus.

FIG. 2 shows in block form an electric system of the video game apparatus, including a central processing unit (CPU) 10 of the microcomputer of the game device 1. In the illustrated embodiment, the video game which is stored in the game cartridge 4 and processed by the CPU 10 is a "success" game, described later on, for growing a rookie baseball player (play character). If another video game, e.g., a baseball match game (fight game), stored in the game cartridge 4 is to be processed by the CPU 10, then the electric system of the video game apparatus needs various control means for performing various operations according to the baseball rules.

FIGS. 3 through 18 show various screen images displayed on the display screen of the display monitor 3, illustrative of how the "success" game proceeds.

In FIG. 2, the ROM 41 in the game cartridge 4 has a memory map for storing various game programs, various patterns of speech patterns in FIGS. 8 through 11), actions of the play character and related characters (see FIG. 12), basic screen image data, background image data, and other image data. The RAM 42 in the game cartridge 4 has a memory map for storing credits, a table of added and subtracted credits, ability settings, physical and mental conditions (physical shape, guts, etc.) as updated values.

The ROM 101, which is connected to the CPU 10, stores a program for decoding commands sent from the keys 21–24 of the controllers 2 and forming basic game image data to be sent to the display monitor 3. The process carried out by the program stored in the ROM 101 with respect to the controllers 2 and the display monitor 3 is of a basic nature which remains the same irrespective of whether one or different game cartridges 4 are used. The RAM 102, which is connected to the CPU 10, serves to temporarily store data which are being processed during the video game.

The display monitor 3 is connected to a display RAM 11 which is connected to the CPU 10. The display RAM 11 stores data of a single screen image at a time. Image data are alternately written into and read out of the display RAM 11 repeatedly at the period of 1/60 second to enable the display monitor 3 to display stable images based on the phenomenon of afterimage.

Figure 3:
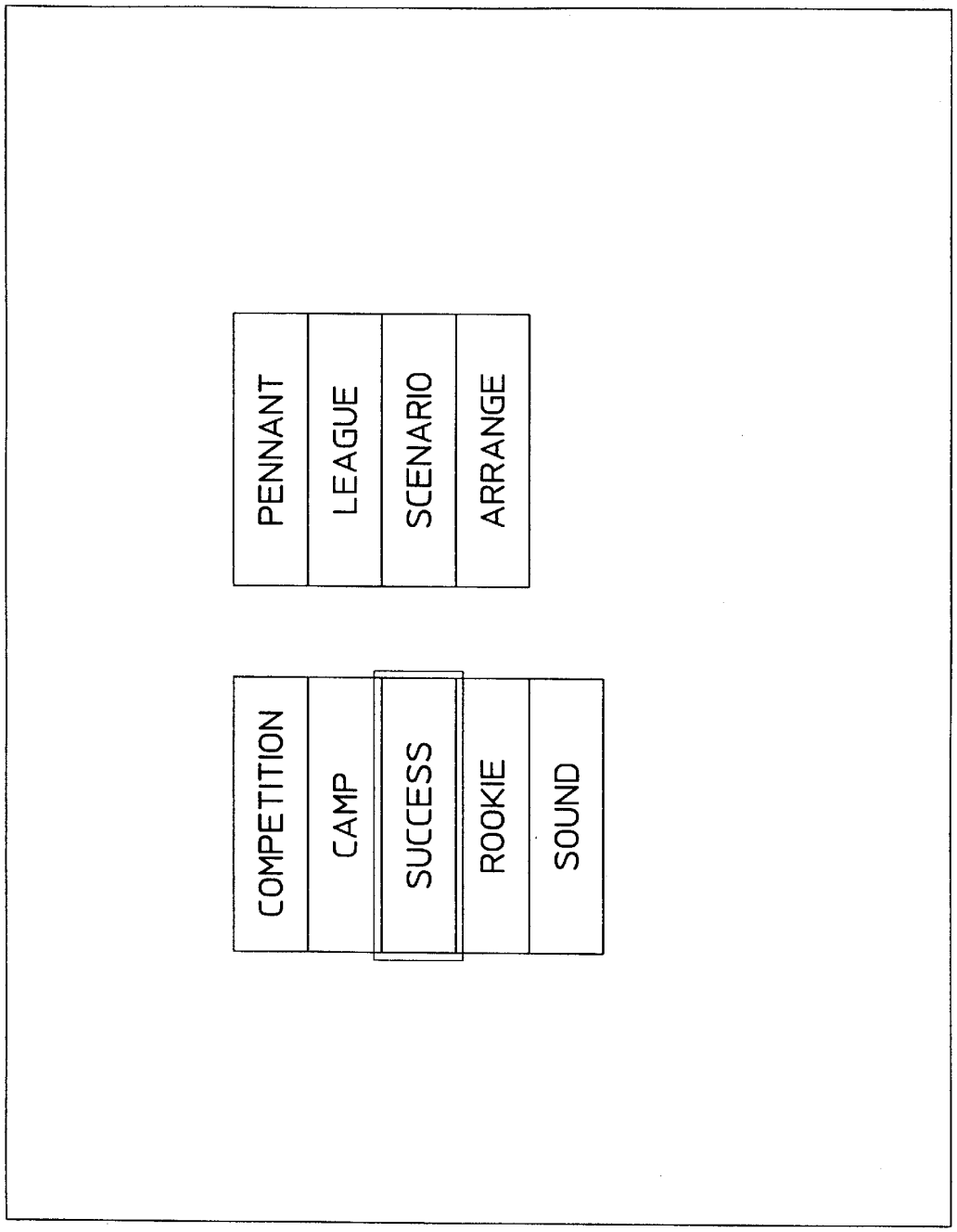
FIG. 3 is a view of an initial screen image displayed on a display screen of the video game apparatus.

A game image forming means 12 determines a game image depending on commands from the controllers 2, a game program stored in the ROM 41, and data stored in the RAM 42, and delivers data of screen images (see FIGS. 3 through 18) to the display RAM 11. For starting a video game, an initial screen image shown in FIG. 3 is displayed on the display monitor 3, and the cross key 23 of one of the controllers 2 is operated by the video game player to move the cursor to "success" (indicated by the double lines), and the control key 24 is then pressed. Now, the "SUCCESS" game is started.

An incrementing/decrementing means 13 adds a predetermined value to "remaining experience credits" (see FIG. 15) when "camp" is selected and various practices are performed, or subtracts a predetermined value from "remaining experience credits" when a negative event occurs.

A probability changing means 14 serves to randomly determine a probability with which the incrementing/decrementing means 13 adds a predetermined value, variance amount, to or subtract a predetermined value, or variance amount, from "remaining experience credits". Specifically, the probability changing means 14 determines a probability in view of changing factors including the types of various practices, the types of various events, the number of months and weeks that have passed, and a history of practices and events that have occurred so far. For example, if these changing factors are of a favorable nature, then they serve to increase the probability, and if they are not, then they serve to reduce the probability, provided a predetermined value is added to "remaining experience credits". Specifically, the probability may be increased or reduced by increasing or reducing the number of numerical values that agree with numerical values, or variance amounts in a certain range.

A remaining experience credits distributing means 15 performs calculations to assign "remaining experience credits" to "various abilities". The "remaining experience credits" are available in three classes: "muscle power", "agility", and "technique". The number of the credits in these classes may be increased depending on the types of practices in "camp" and other factors.

Assignment of the "remaining experience credits" to various "abilities" will be described below with reference to FIGS. 15 through 17. Tables shown in FIGS. 15 and 16 contain numerical values which represent the numbers of "remaining experience credits" which are required to increase various "abilities" by one point. Specifically, in FIG. 15, the "muscle power" has 36 "remaining experience credits", "batting power" has 65 points, and "shoulder power" has 8 points. If the "batting power" is increased up to 67 points by 2 points, and the "shoulder power" is increased up to 9 points by 1 point as shown in FIG. 17, then the number of "remaining experience credits" for "muscle power" is 4 (=36−4×2−24). Similarly, the "technique" which has 44 "remaining experience credits" in FIG. 15 is reduced to 7 "remaining experience credits" (=44−5−32) in FIG. 17 because each of the "shoulder power" and the "fielding" is increased by 1 point. The "agility" which has 65 "remaining experience credits" in FIG. 15 is reduced to 50 "remaining experience credits" (=65−5−10) in FIG. 17 because each of the "shoulder power" and the "fielding" is increased by 1 point.

A month/week changing means 16 serves to spend time by one week each time the control key 24 is pressed once. For example, "February, 1st week" shown in FIG. 6 changes to "February, 2nd week" shown in FIG. 7 and then to "February, 3rd week" shown in FIG. 8, so that time is incremented by one week at a time. The number of years spent by the baseball player with a baseball team is also displayed in an upper area on the display screens shown in FIGS. 6 through 11.

Figure 6:
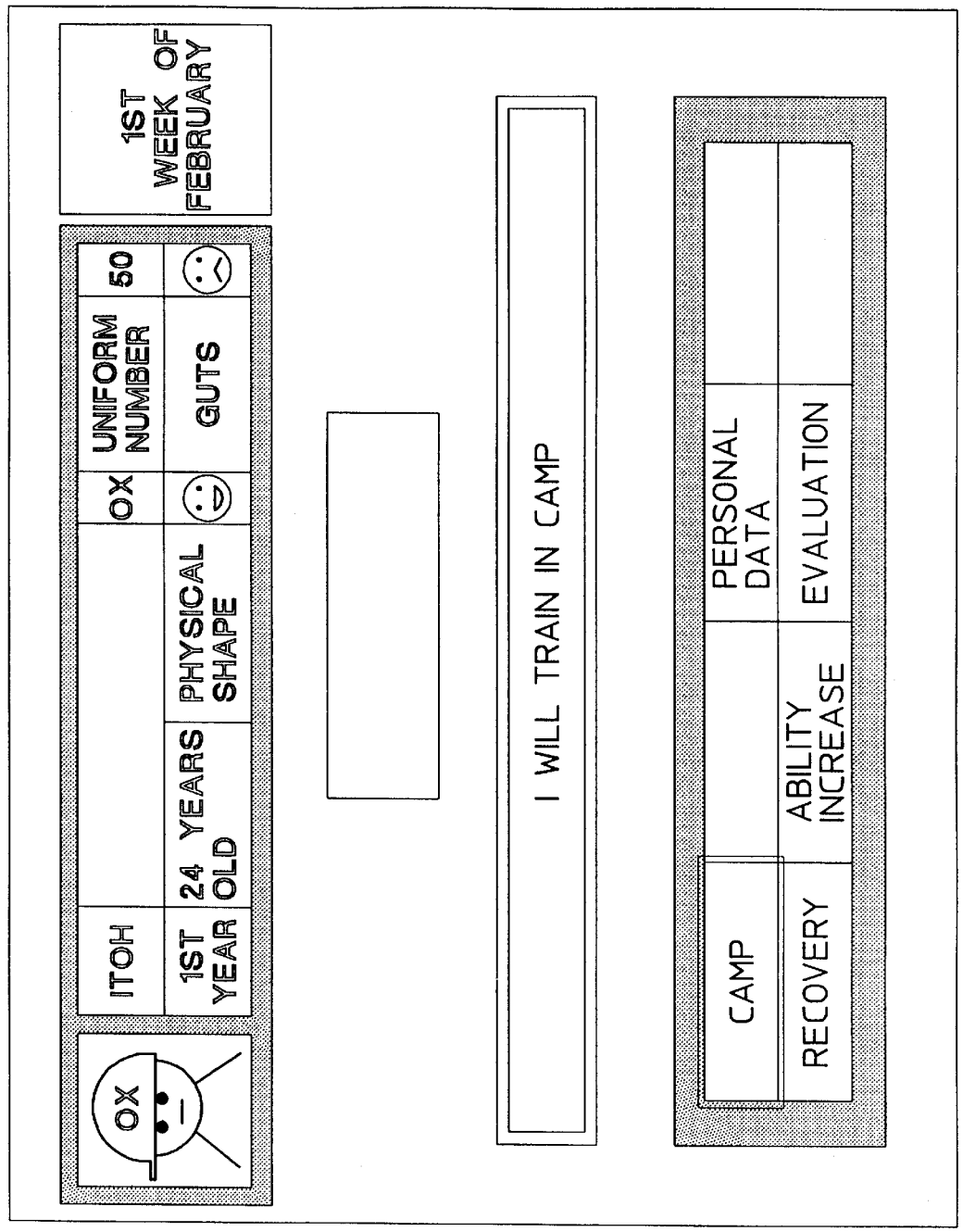
FIG. 6 is a view of a screen image displayed on the display screen for indicating speech and action.

A physical/mental condition changing means 17 serves to represent "physical shape" and "guts" with respective face marks and shown in an upper right area in FIG. 6. The "physical shape" can be reduced when the baseball player practices too much in "camp" (see a lower left area in FIG. 6), and can be increased by "recovery" (see the lower left area in FIG. 6), hospitalization, or the like. The "guts" can be increased or reduced by "camp", and event, "recovery", or "telephone" (see FIG. 9).

A sound generating means 18 sends signals to a loudspeaker 31 to generate speech sounds and effect sounds.

The above various means 12, 13, 14, 15, 16, 17, 18 are connected to the CPU 10.

The various displayed screen images shown in FIGS. 3 through 18 will briefly be described below.

FIG. 3 shows an initial screen image in which various video games are selectable. If a "success" game is selected in the initial screen image by a cursor as shown in FIG. 3, then a screen image shown in FIG. 4 is displayed on the display monitor 3.

Figure 4:
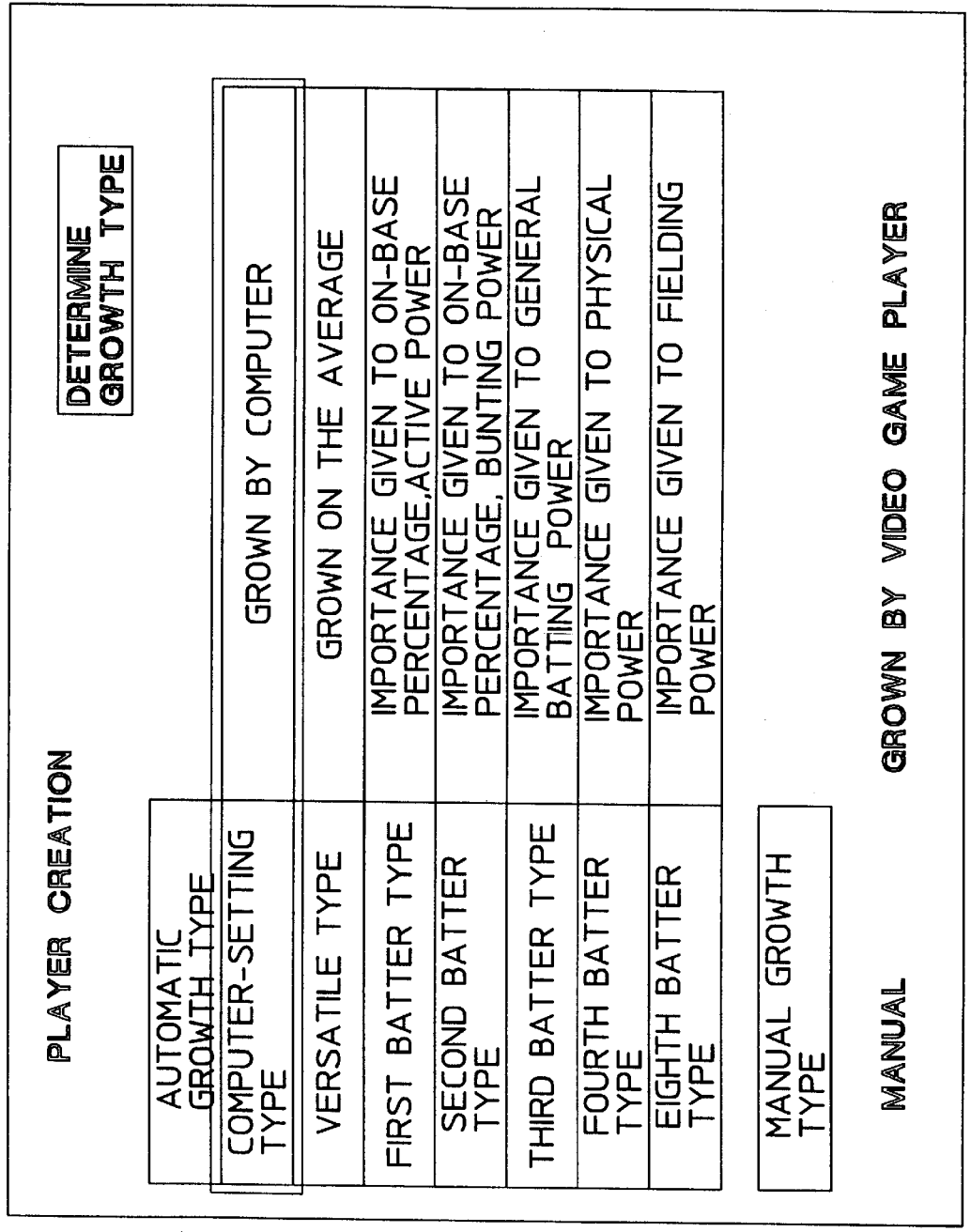
FIG. 4 is a view of a screen image displayed on the display screen for registering a rookie baseball player.

The screen image shown in FIG. 4 serves to register a rookie baseball player in two alternative modes, i.e., "automatic growth type" and "manual growth type". In the "automatic growth type", the growth of a registered rookie baseball player is controlled by the microcomputer. In the "manual growth type", the growth of a register rookie baseball player is controlled manually by the video game player according to custom settings. When the "automatic growth type" is selected, there are available seven baseball player types, i.e., a "computer-setting type", a "versatile type", a "first batter type", a "second batter type", a "third batter type", a "fourth batter type", and an "eighth batter type" to choose from. In FIG. 4, the cursor is set to the "computer-setting type".

FIG. 5 shows a next screen image for entering personal data to identify a rookie baseball player. For example, the personal data include "name", "right- or left-handed", "field position", "form", etc. An item of data which is being established at present is displayed in an upper right area of the screen image. The screen image displays in its lower area data corresponding to data in a location where the cursor is positioned. The video game player can select desired data from the data displayed in the lower area of the screen image. In FIG. 5, the cursor is set to "right-handed thrower, left-handed batter".

FIG. 6 shows a next screen image for indicating events including speech and action. The screen image shown in FIG. 6 displays "camp", "recovery", "ability increase", "personal data", and "evaluation" which can be selected. In FIG. 6, the cursor is set to the "camp".

Figure 7:
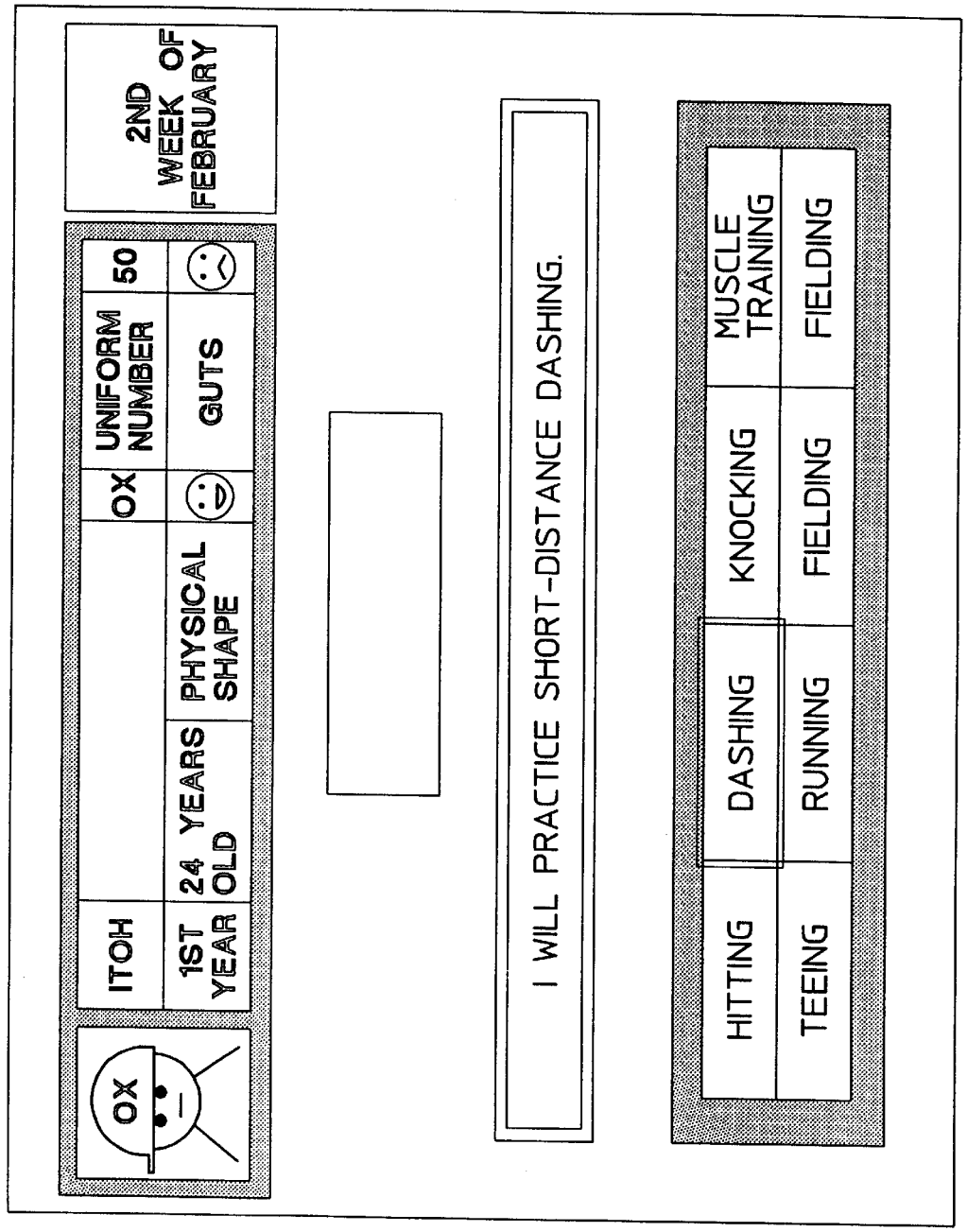
FIG. 7 is a view of a screen image displayed on the display screen when "camp" is selected.

FIG. 7 shows a screen image displayed when the "camp" is selected. The screen image contains practices "batting", "teeing", "dashing" (to which the cursor is set), "running", "knocking", "fielding", "muscle training", and "return". In each of these practices, the numbers of "remaining experience credits" in the different classes are increased or decreased according to the probability determined by the probability changing means 14. For example, if the practice "muscle training" is selected, then the number of "remaining experience credits" for "muscle power" may increase, but the number of "remaining experience credits" for "technique" may decrease. When "return" is selected, the displayed image returns to the preceding screen image. Unlike the other practices, the practice "batting" depends on the ability of the video game player to increase or decrease by a variance amount the numbers of "remaining experience credits" according to the probability determined by the probability changing means 14. Basically, a screen image in which a ball is pitched by a batting pitcher, similar to a screen image shown in FIG. 12 (described later on), is displayed for the baseball player to practice batting a predetermined number of balls. Specifically, the video game player moves a meet cursor MC (FIG. 12), showing a region where the course of the ball meets the bat, vertically and horizontally with the cross key 23, and operates the control key 24 to hit the ball with the bat. If the video game player is successful in batting the ball, then the numbers of "remaining experience credits" are increased by a variance amount according to the probability determined by the probability changing means 14. Conversely, if the video game player fails to hit the ball, then the numbers of "remaining experience credits" are decreased by a variance amount according to the probability determined by the probability changing means 14.

Figure 8:
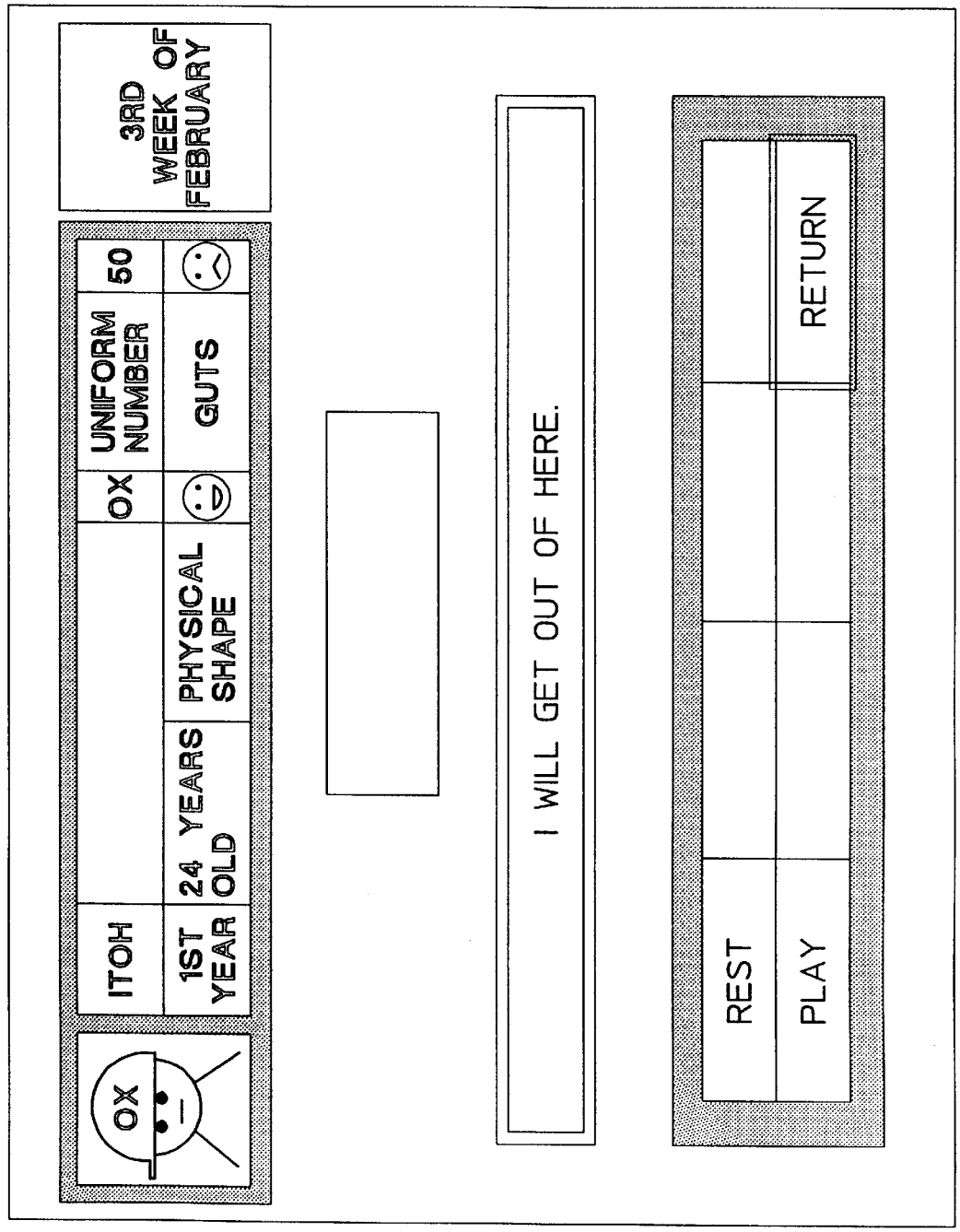
FIG. 8 is a view of a screen image displayed on the display screen when "recovery" is selected.

FIG. 8 shows a screen image displayed when "recovery" shown in FIG. 6 is selected. The screen image shown in FIG. 8 contains "rest", "play", and "return".

Figure 9:
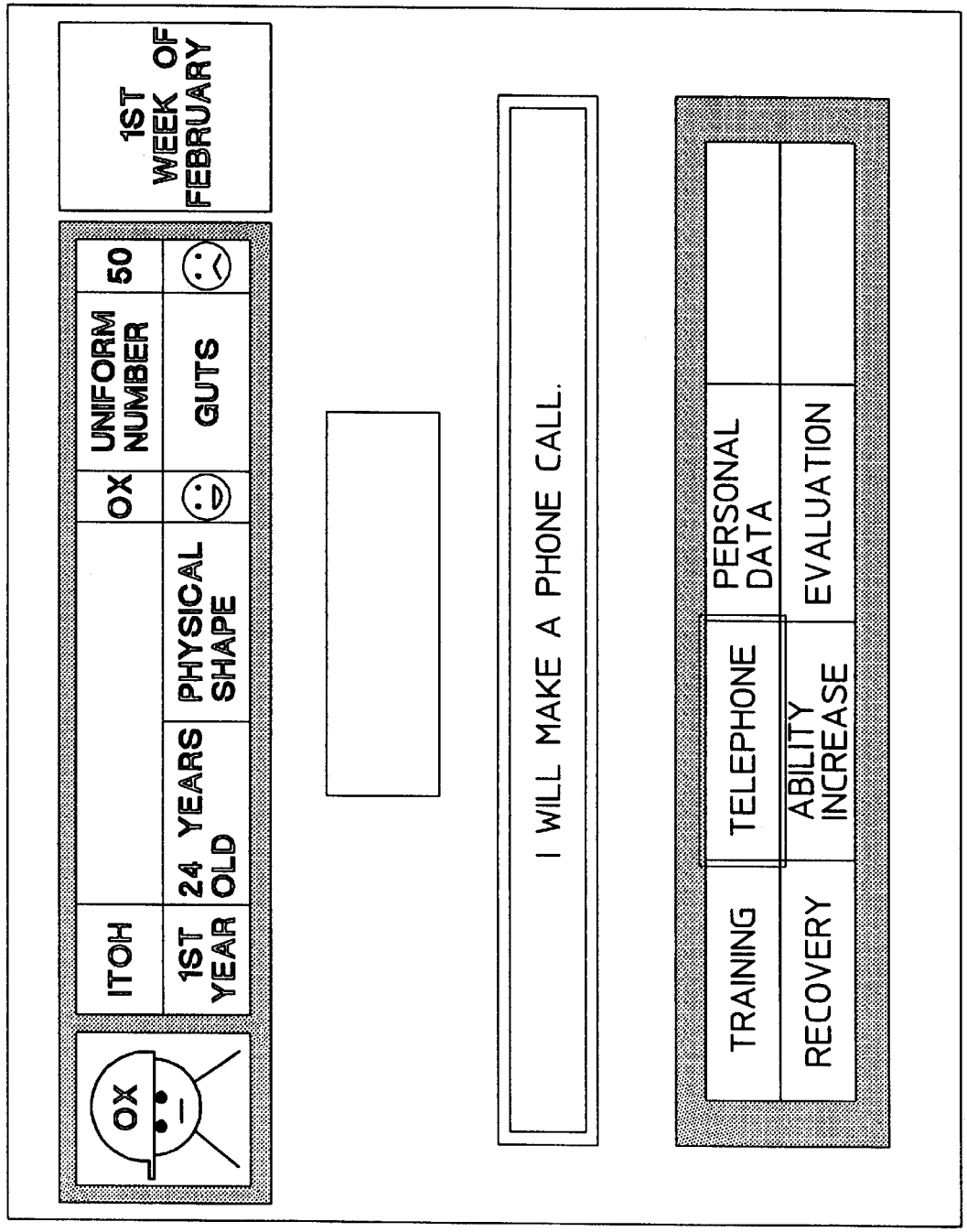
FIG. 9 is a view similar to FIG. 6, showing a screen image in which "telephone" can be selected.

FIG. 9 shows a screen image similar to the screen image shown in FIG. 6 except that "telephone" which is displayed under various conditions can be selected. If the baseball player is hospitalized due to an injury as a negative event, then "recovery" and "telephone" are displayed and "camp" is not displayed in the screen image shown in FIG. 9. Therefore, "camp" cannot be selected in the screen image shown in FIG. 9.

Figure 10:
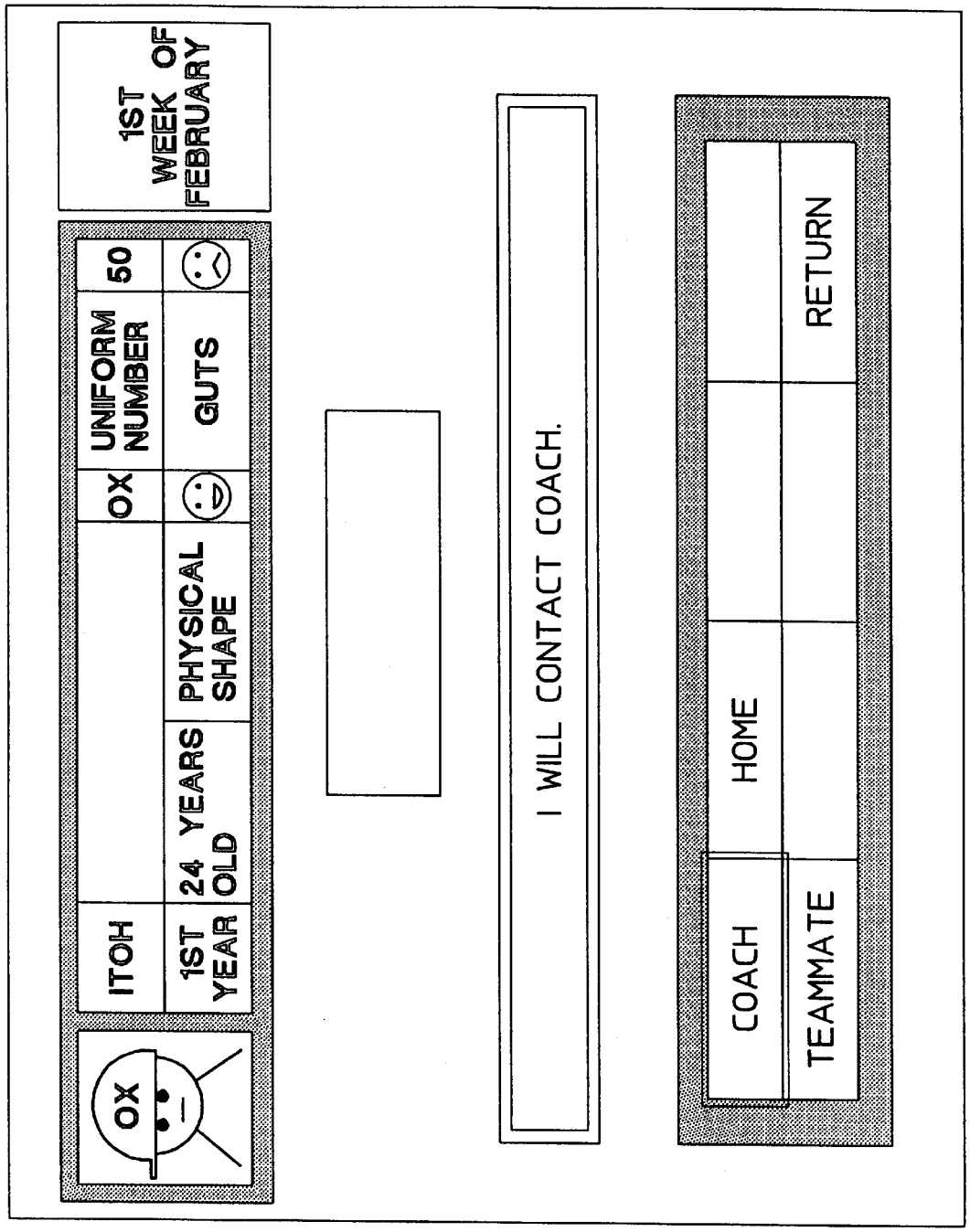
FIG. 10 is a view showing a screen image displayed on the display screen when "telephone" is selected.

FIG. 10 shows a next screen image displayed when "telephone" is selected in the screen image shown in FIG. 9.

When "telephone" is selected, the baseball player can call "coach", "teammate", or "home". If the baseball player calls the "coach", then various conversions are made, and basically the numbers of "remaining experience credits" are increased, but other points fall. If the baseball player calls the "teammate", then the evaluation by the manager increases. If the baseball player calls the "home", then the "guts" increases, but other points drop. The values of these various factors are controlled by the incrementing/decrementing means 13 according to a change in the probability determined by the probability changing means 14.

Figure 11:
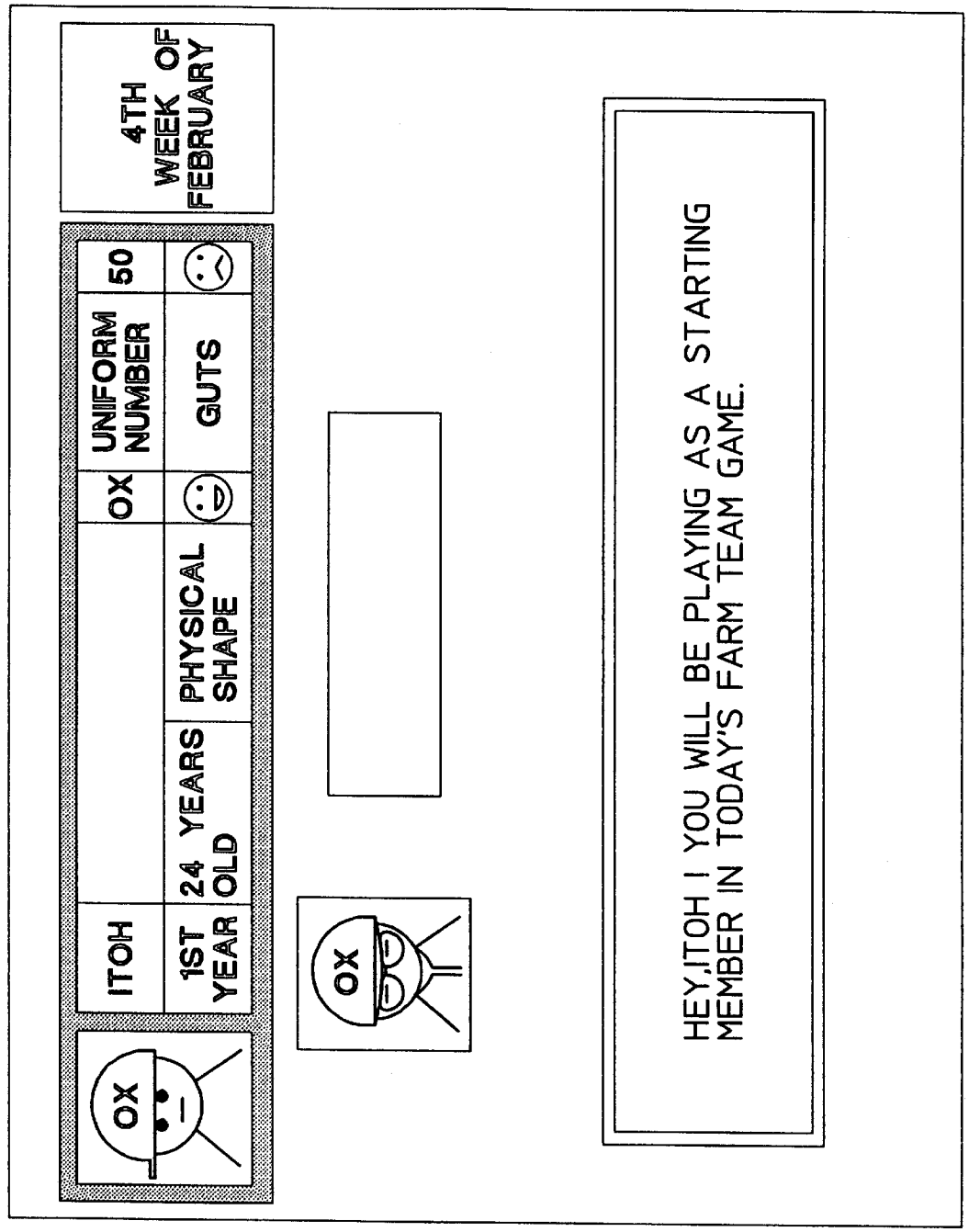
FIG. 11 is a view of a screen image displayed on the display screen, showing a conversation in which the baseball player is ordered to play as a starting member of the farm team.

FIG. 11 shows a displayed screen image showing a conversation in which the baseball player is ordered to play as a starting member of the farm team by the manager based on a favorable evaluation which he has made.

Figure 12:
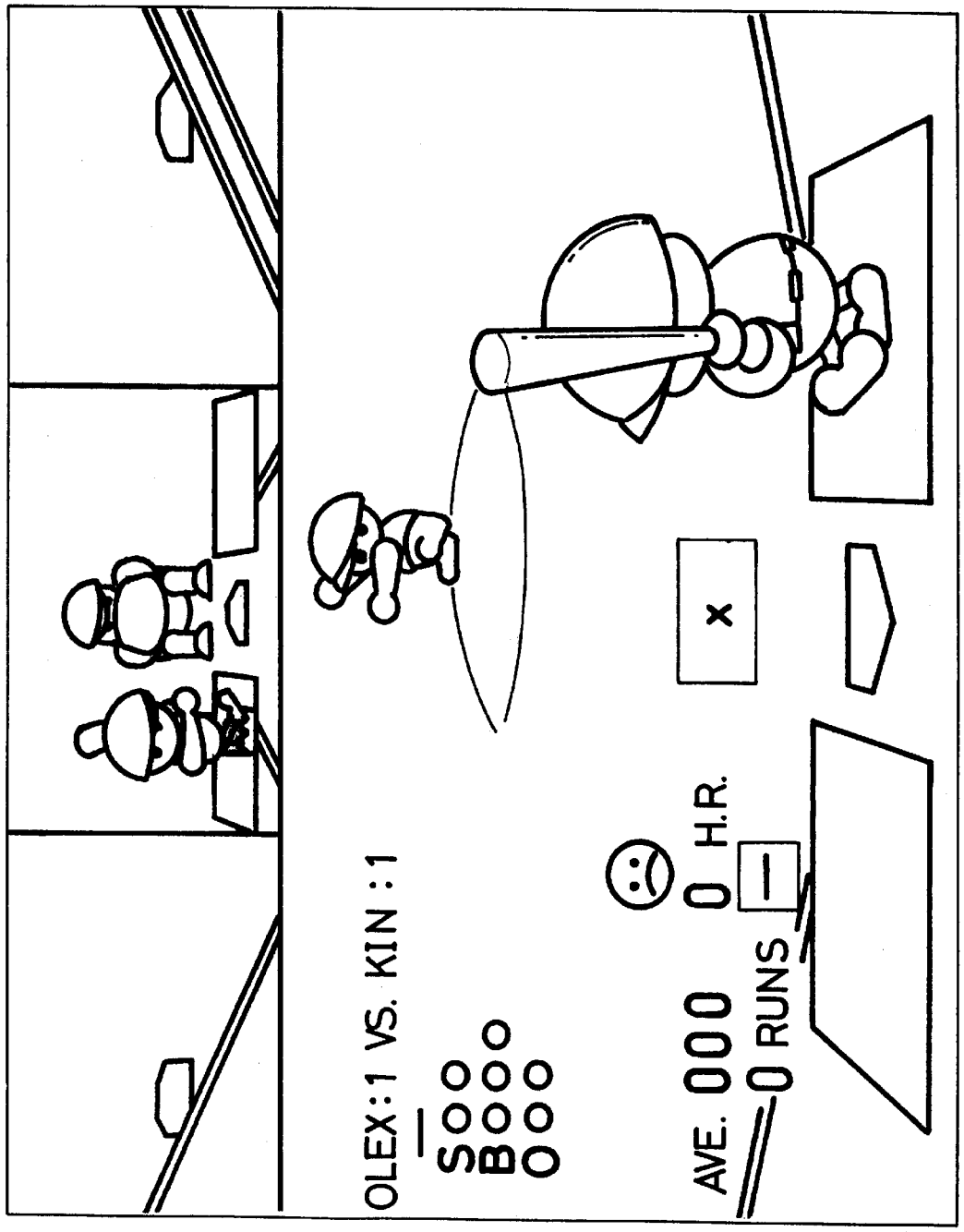
FIG. 12 is a view of a screen image displayed on the display screen, showing the baseball player playing as a batter in a baseball game of the farm team.

FIG. 12 shows a screen image displayed next to the screen image shown in FIG. 11. The screen image shown in FIG. 12 displays the baseball player as he plays as a batter in the game of the farm team. The more hits the baseball player makes, the greater the evaluations made by the coach and the manager.

FIG. 13 shows a screen image displayed to show the results of the baseball player played as a starting member of the farm team. When the baseball player gets "three strikes", the evaluations made by the coach and the manager fall, so does the chance of the baseball player to play as a starting member of the farm team. These results are read as factors by the probability changing means 14 for affecting subsequent addition and subtraction of "remaining experience credits".

Figure 14:
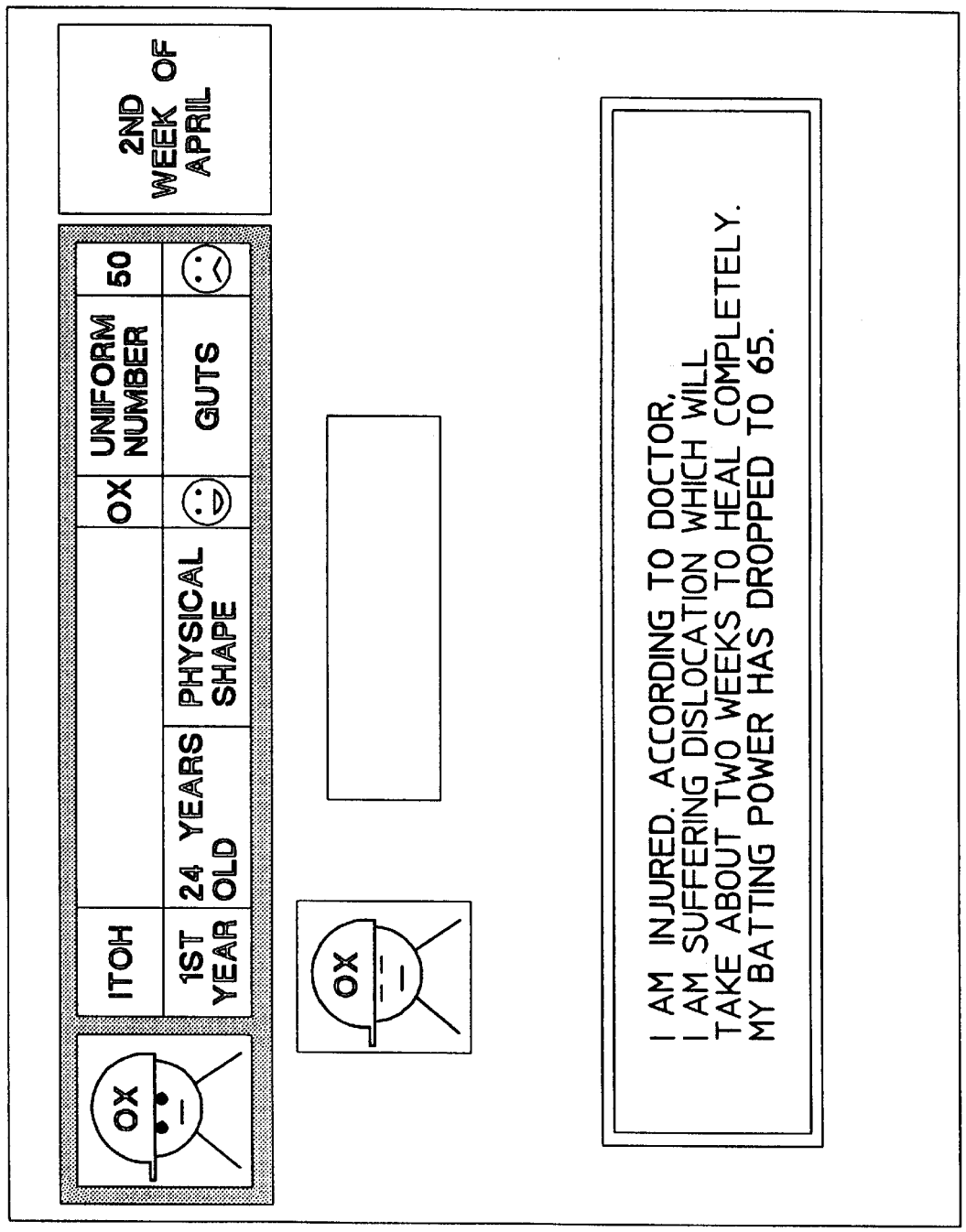
FIG. 14 is a view of a screen image displayed on the display screen when the baseball player has suffered an injury as a negative event.

FIG. 14 shows a screen image displayed when the baseball player has suffered an injury as a negative event.

The details of the screen images shown in FIGS. 15 through 17 have been described above with respect to the assignment of the "remaining experience credits" to various "abilities". FIG. 16 shows a screen image which is displayed when the table shown in FIG. 15 is scrolled. The table displayed in FIG. 16 also contains numerical values which represent the numbers of "remaining experience credits" which are required to increase various "abilities" by one point. In FIG. 16, present and varied numerical values assigned to various "abilities" are omitted from illustration.

Figure 18:
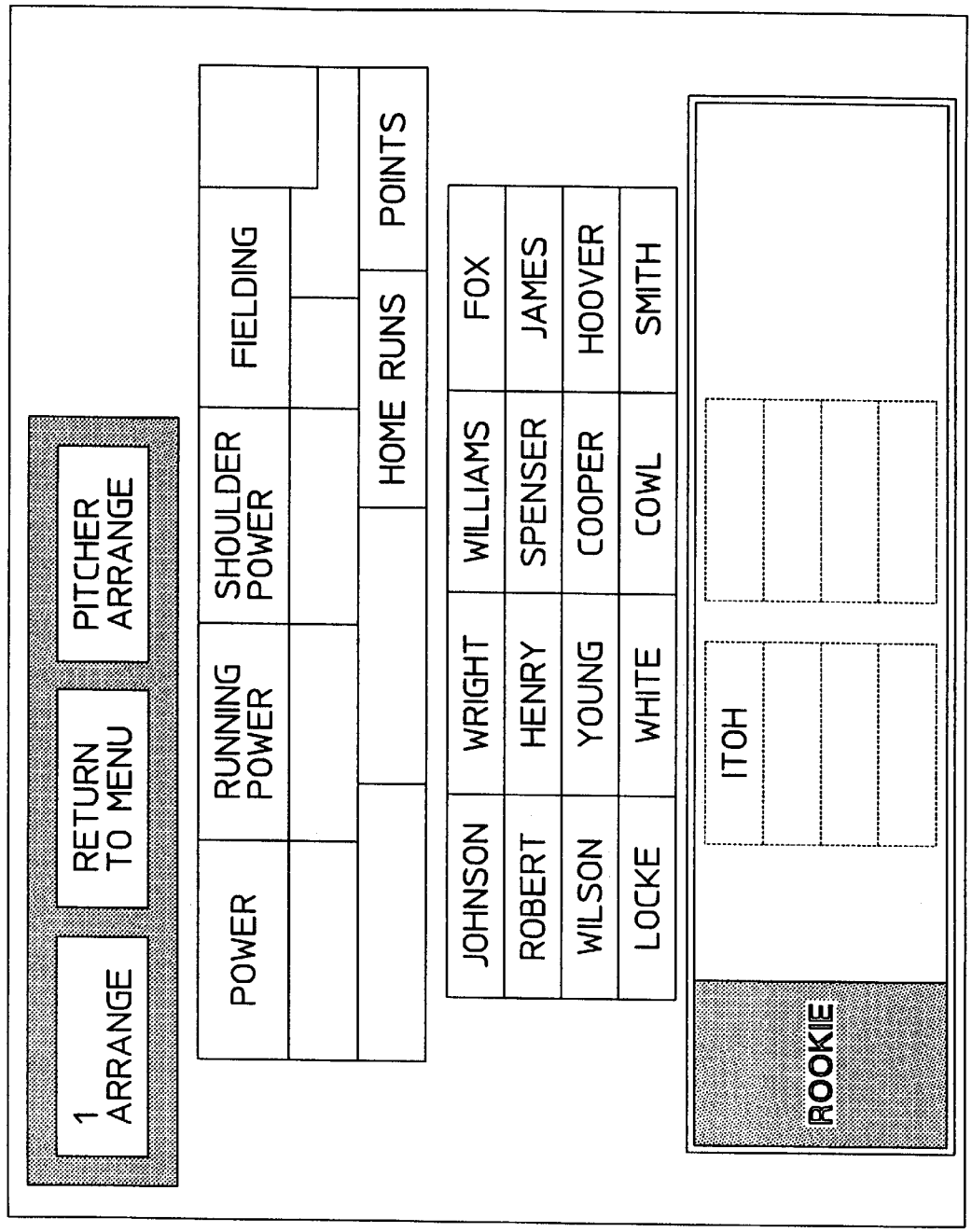
FIG. 18 is a view of a screen image displayed on the display screen for registering a play character as a rookie baseball player.

FIG. 18 shows a screen image displayed for registering a play character as a rookie baseball player. When a rookie baseball player is ordered to go to the major league team by the manager, his name is displayed in one of the boxes in the lower area of the screen image, and he can play in the major league team.

Although not shown, if a grown rookie baseball player goes to the major league team, then he is among the baseball players who can play in the major league team when a competing game is selected on the initial screen image shown in FIG. 3, and the rookie baseball player plays according to his abilities.

Figure 19:
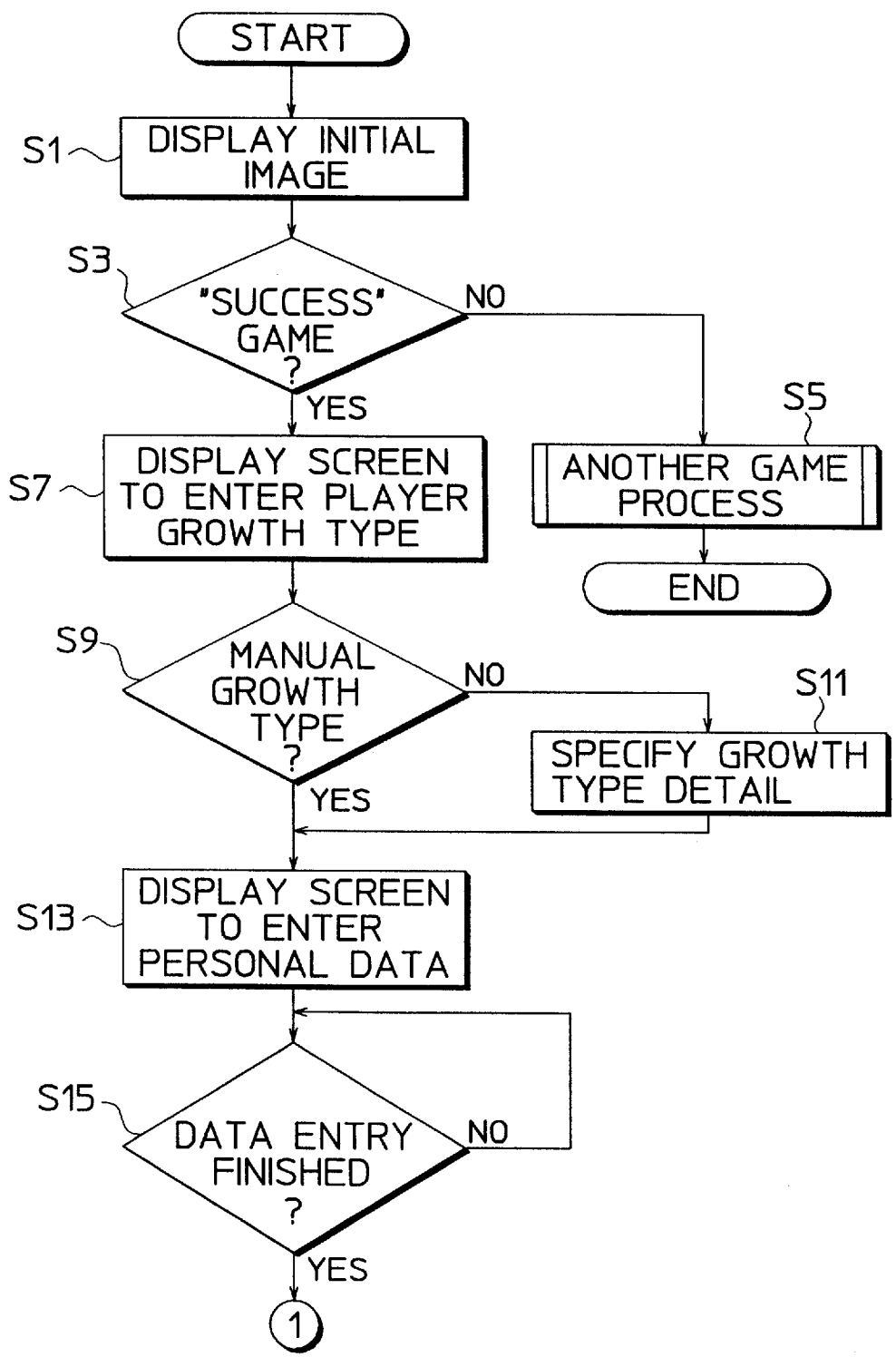
FIG. 19 is a flowchart of a main routine of the procedure of a "success" game.

A main routine of the procedure of a "success" game will be described below with reference to FIG. 19.

In the "success" game, a rookie baseball player who has joined a baseball team repeats various practices and various events including a number of patterns of speech and action in a certain period of time, and grows into a player with unique abilities after being ordered to play as a starting member of the farm team until finally he is ordered to go to the major league team as instructed by the manager.

First, the initial screen image shown in FIG. 3 is displayed in a step S1. If the video game player moves the cursor to "success" on the initial screen image with the cross key 23 and then operates the control key 24 in a step S3, then a "success" game is initiated (YES in the step S3). Otherwise (NO in the step S3), another game is initiated.

When the "success" game is started, a screen image displayed for registering a rookie baseball player as shown in FIG. 4 is displayed on the display monitor 3 in a step S7. Using the cross key 23 and the control key 24, the video game player selects the "manual growth type" or not in steps S9, S11. Then, a screen image for entering personal data to identify a rookie baseball player as shown in FIG. 5 is displayed on the display monitor 3 in a step S13. The video game player then registers desired data at respective items using the cross key 23 and the control key 24. When "finished" on the screen image is clicked after the registration of the data in a step S15, a screen image for indicating speech and action shown in FIG. 6 is displayed in a step S17 (see FIG. 20).

Figure 20:
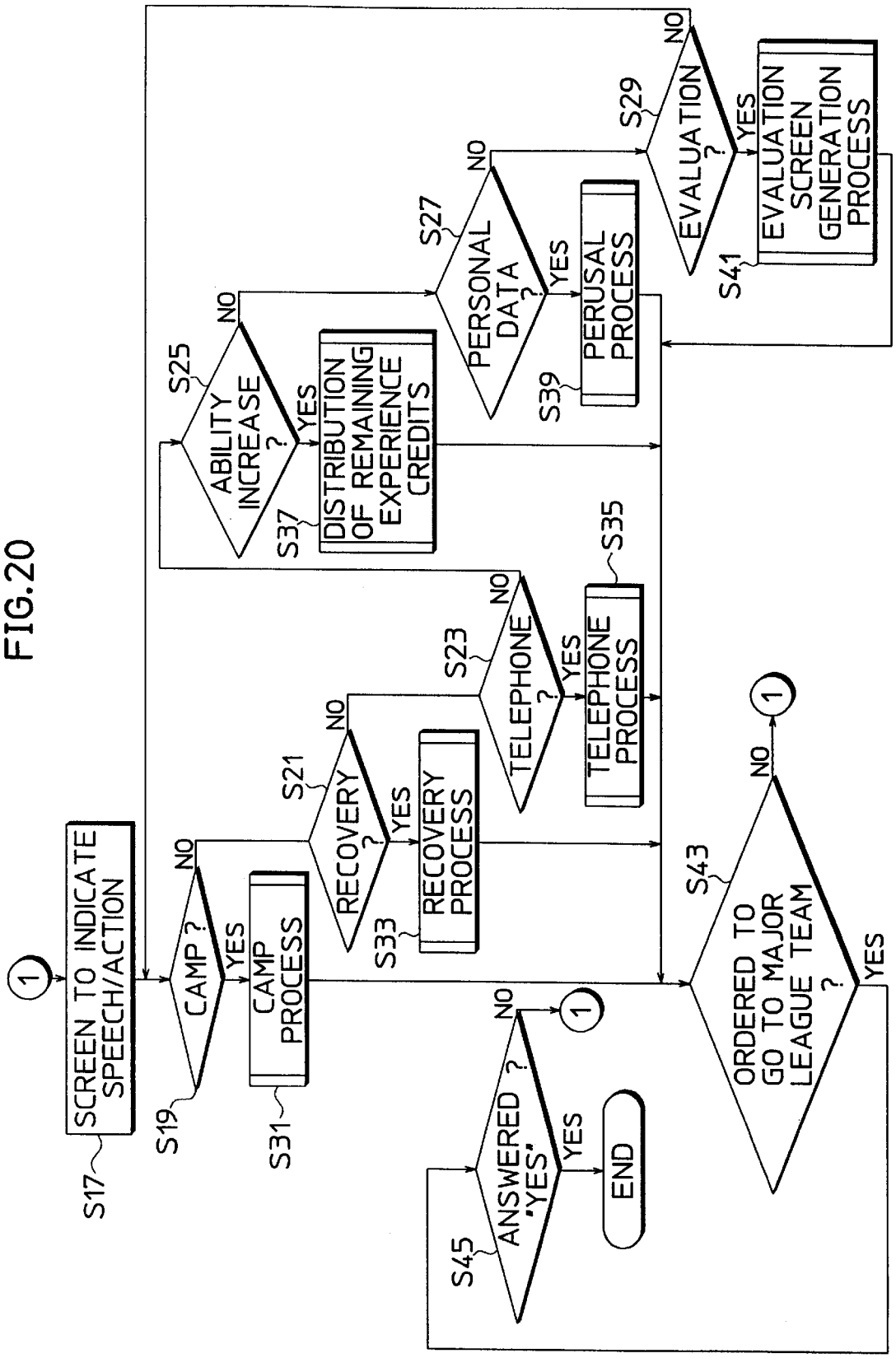
FIG. 20 is a flowchart of a process for indicating speech and action.

FIG. 20 shows a process for indicating speech and action. As shown in FIG. 20, steps S19, S21, S23, S25, S27, and S29 determine whether "camp", "recovery", "telephone", "ability increase", "personal data", and "evaluation", respectively, are selected or not. If they are selected, then corresponding processes are carried out in respective steps S31, S33, S35, S37, S39, and S41. These processes in the steps S31, S33, S35, S37, S39, and S41 will be described in detail below.

Thereafter, it is determined whether the baseball player has been instructed to go to the major league team by the manager or not in a step S43. At this time, "No" and "Yes" are displayed. If the video game player selects "Yes" with the cross key 23 and the control key 24, then the "success" game comes to an end, and the process shown in FIG. 20 is finished. Although not shown in FIG. 20, if the video game player wants to interrupt the "success" game, then the video game player resets the game in a given screen image, whereupon the data entered so far are stored and the process shown in FIG. 20 is finished. The process shown in FIG. 20 is also finished when a certain period of time, e.g., 3 years, in the "success" game has elapsed.

Figure 21:
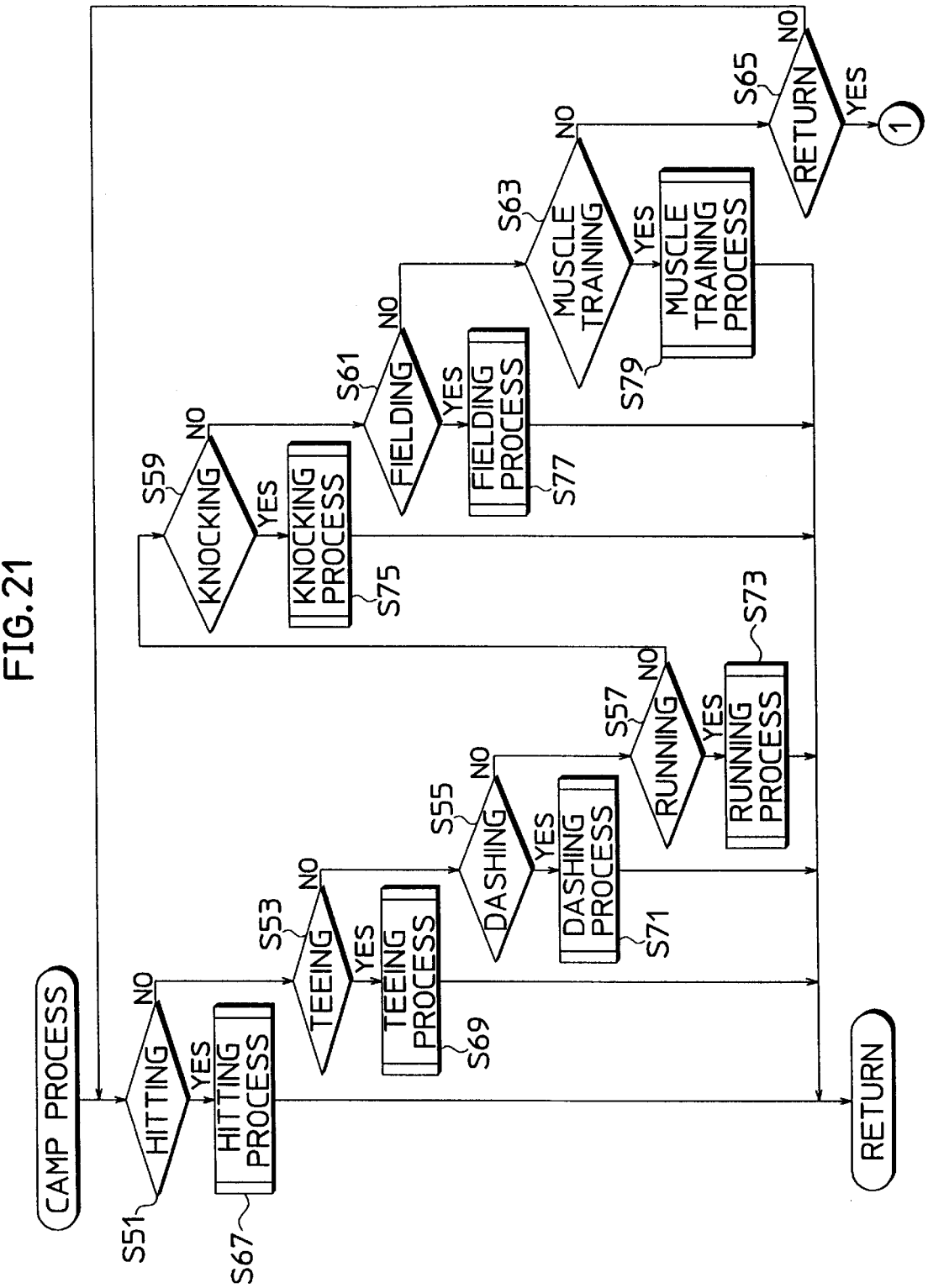
FIG. 21 is a flowchart of a process of "camp"

If "camp" is selected in the step S19 shown in FIG. 20, a screen image shown in FIG. 7 is displayed on the display monitor 3, and a process of "camp" shown in FIG. 21 is executed. In FIG. 21, it is determined whether either one of the practices "batting", "teeing", "dashing" (to which the cursor is set), "running", "knocking", "fielding", and "muscle training" is selected in steps S51, S53, S55, S57, S59, S61, and S63. If they are selected, then corresponding processes are carried out in respective steps S67, S69, S71, S73, S75, S77, and S79. If "return" is selected in a step S65, then control goes back to the step S17 (FIG. 20). Until any one of the practices is selected, control is looped, i.e., goes from the step S65 to the step S51. Basically, the probability changing means 14 is set to different probabilities with respect to the respective practices.

Figure 22:
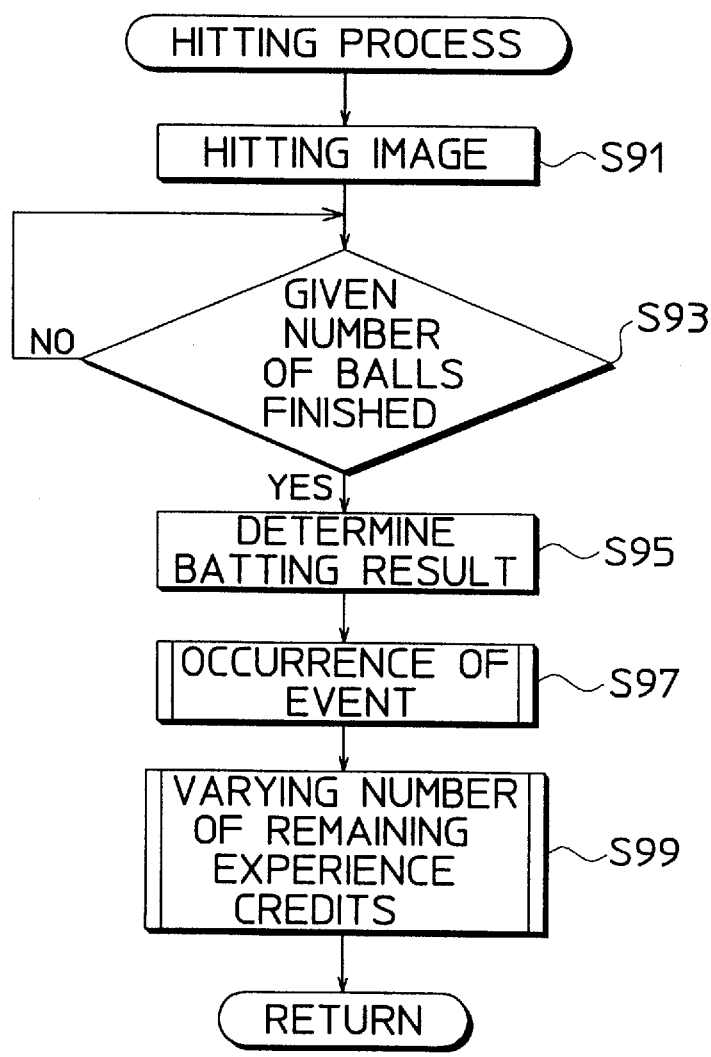
FIG. 22 is a flowchart of a process that is carried out when "batting" is indicated.

If "batting" is indicated in the screen image shown in FIG. 7, then a screen image similar to the screen image shown in FIG. 12 is displayed on the display monitor 3. The batting practice is carried out according to a process shown in FIG. 22. First, a batting practice image is displayed, and the batting pitcher throws a ball in the batting practice image in a step S91. The video game player moves the meet cursor MC on the batting practice image with the cross key 23, and instructs the displayed baseball player to swing the bat with the control key 24. The result of the batting practice is displayed in an image similar to the screen image shown in FIG. 13. If the batting practice with respect to a predetermined number of balls, i.e., 10 balls, is finished in a step S93, then the result of the batting practice is determined in a step S95. An event takes place and is displayed in a step S97, and a probability is established to vary the "remaining experience credits" in a step S99. Specifically, the probability to vary the "remaining experience credits" is changed by the probability changing means 14 based on the result of the batting practice. If the result of the batting practice is good, i.e., the baseball player has made many hits, then the probability for increasing the number of "remaining experience credits" is increased, i.e., the number of "remaining experience credits" for "technique" is increased by a variance amount corresponding to a large number of credits, and the "physical shape" of the baseball player is reduced. As a whole, therefore, the advantages and disadvantages of the baseball player are canceled out. If the result of the batting practice is poor, then the probability for reducing the number of "remaining experience credits" is increased, i.e., the number of "remaining experience credits" for "technique" is reduced by a variance amount. The probability for increasing or reducing the number of "remaining experience credits" is varied in small increments or decrements in view of various other factors including "physical shape", "guts", the number of months and weeks that have passed, and the practicing condition in previous "camp", etc.

Figure 23:
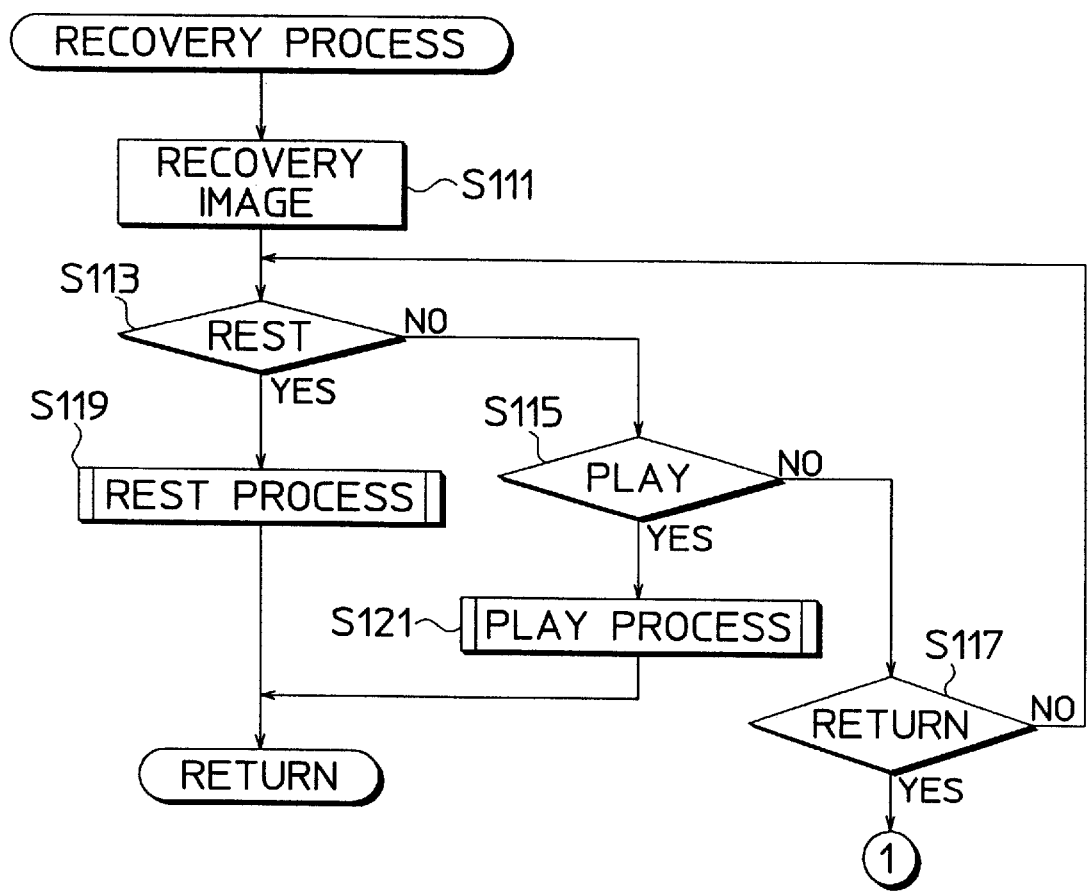
FIG. 23 is a flowchart of a process that is carried out when "recovery" is indicated.

FIG. 23 shows a process that is carried out when "recovery" on the screen image shown in FIG. 6 is indicated. In this process, the screen image shown in FIG. 8 is displayed in a step S111. It is determined whether either one of "rest", "play", and "return" is selected in steps S113, S115, and S117. If "rest" and "play" are selected in the steps S113, S115, then corresponding processes are carried out in respective steps S119, S121. If "return" is selected in the step S117, then control goes back to the step S113. When "recovery" is indicated, the physical/mental conditions, i.e., "physical shape" and "guts", of the baseball player are increased (they may be increased by different degrees for "rest" and "play"), and the numbers of "remaining experience credits" for "muscle power" and "agility" are reduced based on probability. If "play" is selected, the degree by which the numbers of "remaining experience credits" for "muscle power" and "agility" are reduced may be reduced, or the numbers of "remaining experience credits" for "muscle power" and "agility" may be maintained provided a sport is registered for "hobby" in the personal data (see FIG. 5).

Figure 24:
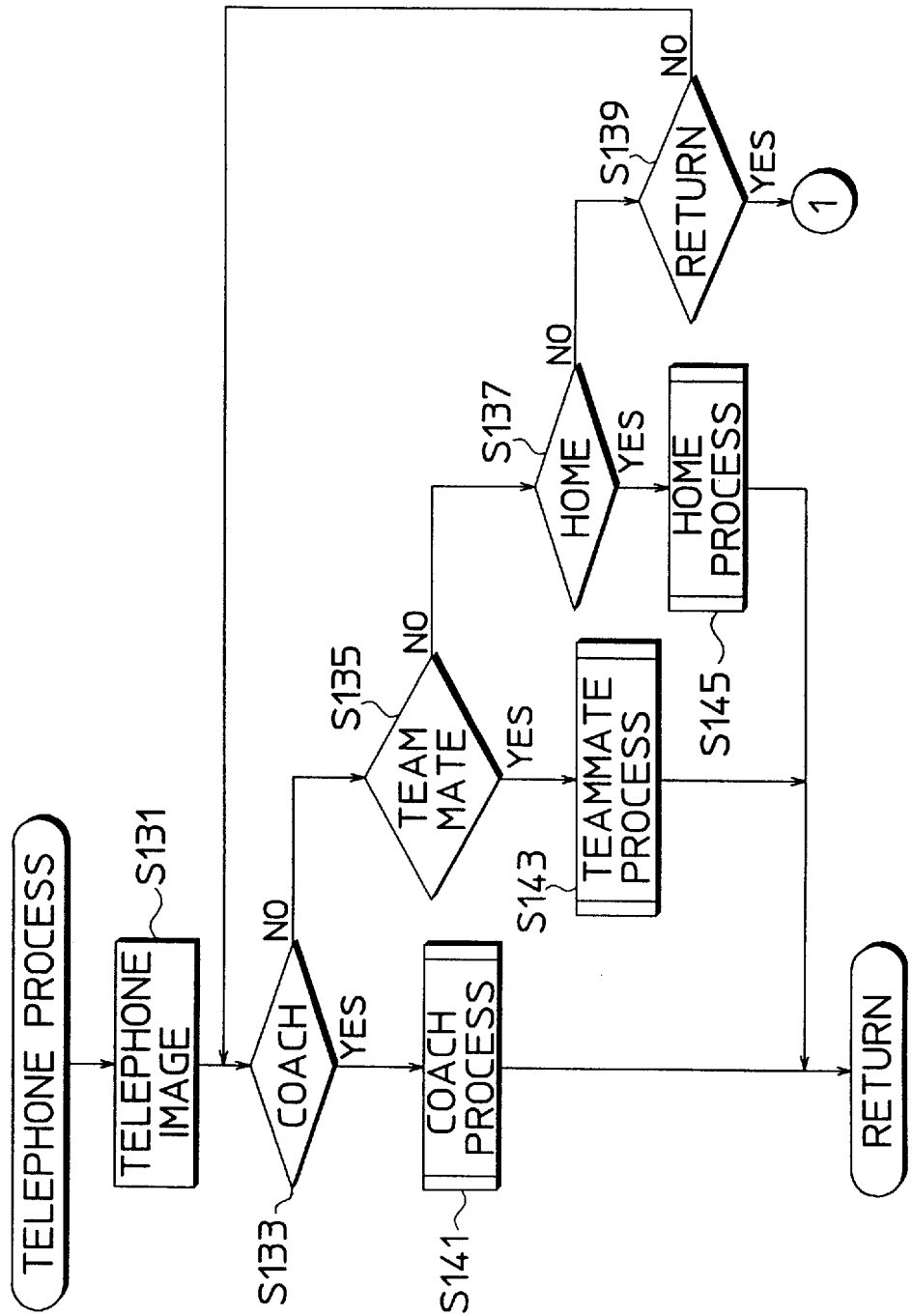
FIG. 24 is a flowchart of a process that is carried out when "telephone" is indicated.

FIG. 24 shows a process that is carried out when "telephone" on the screen image shown in FIG. 9 is indicated. In this process, the screen image shown in FIG. 10 is displayed in a step S131. It is determined whether either one of "coach", "teammate", "home", and "return" is selected in steps S133, S135, S137, and S139. If "coach", "teammate", and "home" are selected in the steps S133, S135, S137, then corresponding processes are carried out in respective steps S141, S143, S145. If "return" is selected in the step S139, then control goes back to the step S133. If a telephone call is made to the "coach", then the confidence which the coach and the manager has in the baseball player is increased in view of the history of practices so far, resulting in an increase in the "guts" and the opportunity of playing as a starting member in a game of the farm team. However, the confidence which the teammates have in the baseball player is reduced, and the rate at which negative events occur is increased, tending to cause the number of "remaining experience credits" to be reduced unexpectedly. If the baseball player calls "teammate", then the number of "remaining experience credits" is not directly affected, but the rate at which positive events occur is increased, resulting in an increase in the probability that the number of "remaining experience credits" will be increased. If the baseball player calls "home", then the "guts" is increased or reduced in view of the history of practices so far.

FIGS. 11 through 13 show successive screen images which are displayed when the baseball player is ordered to play as a starting member in a game of the farm team by the manager. FIG. 11 shows a screen image which contains an order from the manager to play as a starting member. FIG. 12 shows a screen image in which the baseball player is standing as a batter in a batter's box. In FIG. 12, the video game player moves the meet cursor MC horizontally and vertically with the cross key 23 and causes the batter to swing the bat with control key 24, trying to hit the ball. FIG. 13 shows the batting results of the baseball player. The more the number of hits, the confidence which the coach and the manager has in the baseball player is increased. Otherwise, the confidence in the baseball player is reduced. The confidence thus determined is reflected in the "guts". Since the speech and action of the play character as the baseball player employ elements directly involving the abilities of the video game player, as described above, the video game develops many aspects as the play character grows, and makes itself interesting and gives the video game player a lot of fun.

Figure 25:
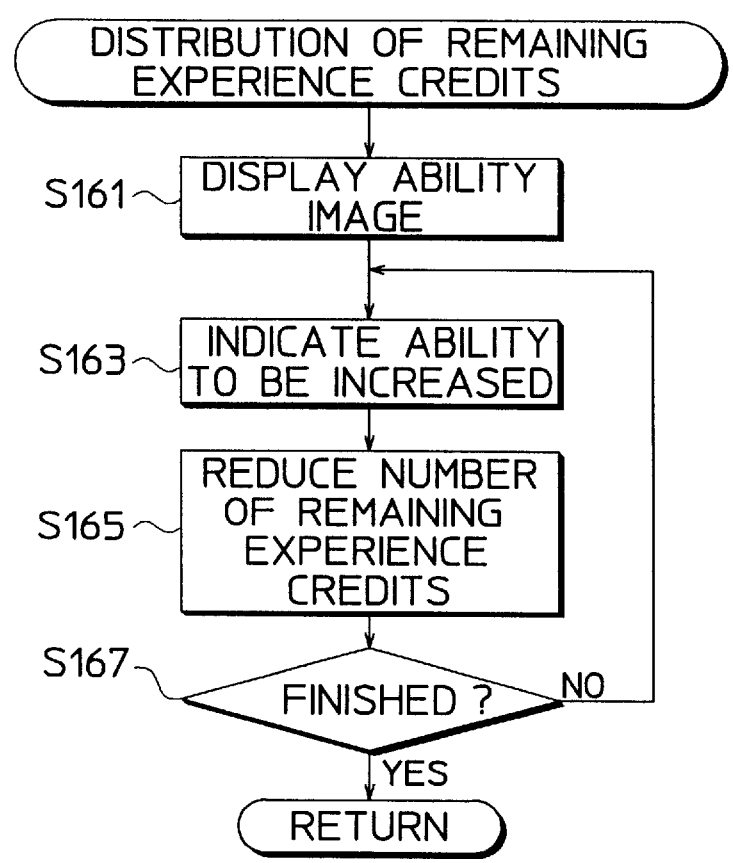
FIG. 25 is a flowchart of a process for distributing "remaining experience credits".

FIG. 25 shows a process for distributing "remaining experience credits". In this process, the screen images shown in FIGS. 15 through 17 are displayed in a step S161. When the video game player positions the cursor in an ability to be increased with the cross key 23 and then presses the control key 24 in a step S163, the present ability increases by a rank corresponding to the number of times that the control key 24 is pressed. When the ability is increased, the corresponding number of "remaining experience credits" which the baseball player has is reduced in a step S165. Any of the abilities can be increased until the corresponding "remaining experience credits" are eliminated. If the meet circle is increased from a present rank D to a rank C, for example, then a large number of unit credits is necessary to increase the abilities. In the example shown in FIG. 15, 4 credits are needed from the "remaining experience credits" for "muscle power" in order to increase the "batting power" by one rank. Since the abilities can be increased, when necessary, from the screen image shown in FIG. 6, the video game player can impart various abilities to the play character. However, "remaining experience credits" may not be obtained as desired.

In the above embodiment, the video game has been described as a game for growing a baseball player. However, the principles of the present invention are also applicable to various competing games in sports and other fields which require players to have individual abilities and unique characters.

The data of the play character according to the embodiment may be stored in the RAM of the game cartridge 4 (see FIG. 1), and may be sent, with a password, into a competing game which is played by the video game player and another video game player to enjoy the competing game with the play character and a play character which has been grown by the other video game player.

Although a certain preferred embodiment of the present invention has been shown and described in detail, it should be understood that various changes and modifications may be made therein without departing from the scope of the appended claims.

What is claimed is:

1. A video game apparatus for operation by a video game player, comprising:

a display unit for displaying a player character and player event patterns of said player character including at least one of speech and actions, and menus corresponding to said player event patterns;

an input control unit for permitting selection of said player event patterns from said menus by said video game player;

event memory means for storing said player event patterns selected by said input control unit;

event control means for reading said player event patterns selected by said input control unit from said event memory means and controlling said player character to perform said player event patterns;

credit memory means for storing a number of at least one type of credit given to said player character;

credit varying means for varying said number of said at least one type of credit by a variance amount depending on said player event patterns selected by said input control unit;

probability change control means for randomly setting a probability of said variance amount being one of a range of values depending on said player event patterns selected by said input control unit;

ability value memory means for storing a plurality of ability values representing a plurality of abilities of said player character; and distributing means for permitting said video game player to effect a distribution of said credits from said credit memory means to said plurality of ability values in response to said input control unit, and updating said ability values stored in said ability value memory means according to the distribution.

2. The video game apparatus according to claim 1, wherein at least one type of event of said player event patterns is governed by an ability of said video game player to operate said input control means, and said probability control means includes means for varying said probability based on said at least one type of event.

3. The video game apparatus according to claim 1, wherein said probability control means includes means for varying said probability depending on a plurality of events selected by said input control unit.

4. The video game apparatus according to claim 1, further comprising timer means for allowing a predetermined period of time to elapse each time said input control unit selects one of said menus, said event control means comprising means for randomly varying said player event patterns depending on passage of said predetermined period of time when said input control unit selects one of said menus, and said probability control means comprising means for varying said probability depending on said player event patterns randomly varied by said event control means.

5. The video game apparatus according to claim 1, further comprising condition memory means for storing at least one of a physical and mental condition of said player character, and condition changing means for changing said at least one of said physical and mental condition of said player character depending on said player event patterns selected by said input control unit, and said probability control means comprising means for varying said probability depending on said at least one of said physical and mental condition of said player character.

6. The video game apparatus according to claim 1, further comprising competing game control means for carrying out a competing game with said display unit, said input control unit having means for selecting either one of a mode growing said player character and a mode for performing said competing game, and said competing game control means comprising means responsive to a selection by said control unit of said mode for performing said competing game, for introducing said player character having said ability values into said competing game and controlling said player character to act according to said ability values in said competing game.

7. A method of controlling growth of a player character in a video game performed by a video game apparatus having a display unit for displaying said player character and player event patterns of of said player character, and menus corresponding to said player event patterns, an input control unit for permitting a video game player to select said menus, event memory means for storing said player event patterns selected by said input control unit, and event control means for reading said player event patterns selected by said input control unit from said event memory means and controlling said player character to perform said player event patterns, said method comprising the steps of:

imparting a number of at least one type of credit to said player character;

varying said number of said at least one type of credit by a variance amount selected based on a random probability from a range of amounts depending on said player event patterns selected by said input control unit;

storing said number of said at least one type of credit after said varying;

permitting said video game player to operate said input control unit to distribute said number of said at least one type of credit to a plurality of ability values representing a plurality of abilities of said player character; and storing said ability values with said number of said at least one type of credit distributed thereto.

8. A video game medium for use in a video game, the video game machine including means for displaying player event patterns including at least one of speech and action executed by a player character, and input control unit means for permitting selection of menus corresponding to said player event patterns, and event control means for controlling said player character to perform said player event patterns selected by said input control unit, said video game medium comprising:

means for imparting a number of at least one type of credit to said player character;

means for varying said number of said at least one type of credit by a variance amount selected based on a random probability from a range of amounts depending on said player event patterns selected by said input control unit;

means for storing said number of said at least one type of credit after said varying;

means for permitting said video game player to operate said input control unit to distribute said number of said at least one type of credit to a plurality of ability values representing a plurality of abilities of said player character; and storing said ability values with said number of said at least one type of credit distributed thereto.

9. A video game apparatus for operation by a video game player, comprising:

a display unit for displaying a player character and player event patterns of said player character including at least one of speech and actions, and menus corresponding to said player event patterns;

an input control unit for permitting selection of said player event patterns from said menus by said video game player;

event memory means for storing said player event patterns selected by sad input control unit;

event control means for reading said player event patterns selected by said input control unit from said event memory means and controlling said player character to perform said player event patterns;

credit memory means for storing a number of at least one type of credit given to said player character;

credit varying means for varying said number of said at least one type of credit by a variance amount depending on said player event patterns selected by said input control unit;

probability change control means for randomly setting a probability of said variance amount being one of a range of values depending on said player event patterns selected by said input control unit; and ability value memory means for storing an ability value representing an ability of said player character, said ability value being dependent on said number of said at least one type of credit.

* * * * *